(12) United States Patent
Akachi et al.

(10) Patent No.: US 10,569,652 B2
(45) Date of Patent: Feb. 25, 2020

(54) INFORMATION PROCESSING SYSTEM, ON-VEHICLE DEVICE, AND TERMINAL DEVICE FOR PRIVACY MANAGEMENT

(71) Applicant: CLARION CO., LTD., Saitama (JP)

(72) Inventors: Masashi Akachi, Saitama (JP); Haruki Kobayashi, Saitama (JP); Shizue Kato, Saitama (JP); Hiroshige Furugori, Saitama (JP); Masashi Koga, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 46 days.

(21) Appl. No.: 15/533,526

(22) PCT Filed: Feb. 16, 2016

(86) PCT No.: PCT/JP2016/054364
§ 371 (c)(1),
(2) Date: Jun. 6, 2017

(87) PCT Pub. No.: WO2016/133060
PCT Pub. Date: Aug. 25, 2016

(65) Prior Publication Data
US 2018/0264943 A1 Sep. 20, 2018

(30) Foreign Application Priority Data
Feb. 19, 2015 (JP) ................................ 2015-030705

(51) Int. Cl.
*B60K 35/00* (2006.01)
*B60R 16/02* (2006.01)
(Continued)

(52) U.S. Cl.
CPC .............. *B60K 35/00* (2013.01); *B60K 37/06* (2013.01); *B60R 16/02* (2013.01); *G01C 21/36* (2013.01);
(Continued)

(58) Field of Classification Search
CPC .............. G09G 3/2092; G09G 3/2096; G09G 2370/022; G09G 2370/042;
(Continued)

(56) References Cited

U.S. PATENT DOCUMENTS

2010/0115505 A1* 5/2010 Touati ................... G07C 5/008
717/171
2011/0187547 A1 8/2011 Kweon
(Continued)

FOREIGN PATENT DOCUMENTS

EP 2787472 A1 10/2014
JP 2006-133006 A 5/2006
(Continued)

OTHER PUBLICATIONS

International Preliminary Report on Patentability issued for corresponding PCT/JP2016/054364.
(Continued)

*Primary Examiner* — Keith L Crawley
(74) *Attorney, Agent, or Firm* — IP Business Solutions, LLC

(57) ABSTRACT

Information can be displayed on display devices according to information to be notified. An information processing system 1 includes a navigation device 3, a mobile terminal 5, and a control server 7, wherein the navigation device 3 is connected to a head-up display 4 that can be visually recognized by a driver and includes a display panel 33a that can be visually recognized by the driver and a passenger other than the driver, the mobile terminal 5 transmits noti-
(Continued)

fication information to the navigation device 3 and transmits notification related information regarding the notification information to the control server 7, the control server 7 determines a display device that displays information based on the notification information in the navigation device 3 based on the notification related information received from the mobile terminal 5 and transmits display location information indicating the determined display device to the navigation device 3, and the navigation device 3 displays the information based on the notification information on the display device indicated by the received display location information.

4 Claims, 11 Drawing Sheets

(51) Int. Cl.
*G01C 21/36* (2006.01)
*G08G 1/0962* (2006.01)
*B60K 37/06* (2006.01)

(52) U.S. Cl.
CPC .... *G08G 1/0962* (2013.01); *B60K 2370/1529* (2019.05); *B60K 2370/1575* (2019.05); *B60K 2370/182* (2019.05); *B60K 2370/1876* (2019.05); *B60K 2370/195* (2019.05); *G09G 2380/10* (2013.01)

(58) Field of Classification Search
CPC .... G09G 2380/10; B60K 35/00; B60K 37/06; B60K 2350/10; B60K 2350/1056; B60K 2350/106; B60K 2350/1068; B60K 2350/1076; B60K 2350/1096; B60K 2350/352; B60K 2350/357; B60K 2350/901; B60K 2350/903; B60K 2350/906; B60K 2350/962; B60K 2350/967; B60K 2370/152; B60K 2370/1529; B60K 2370/1575; B60K 2370/16; B60K 2370/172; B60K 2370/18; B60K 2370/182; B60K 2370/184; B60K 2370/186; B60K 2370/1868; B60K 2370/1876; B60K 2370/195; B60R 16/02; G01C 21/36; G01C 21/3617; G01C 21/362; G01C 21/3629; G01C 21/365; G01C 21/3661; G01C 21/3688; G08G 1/0962; G08G 1/09626; G08G 1/096766; G08G 1/096775; G08G 1/096855; G08G 1/096883; G02B 27/01; G02B 2027/0138; G02B 2027/014; G02B 2027/0141; G02B 2027/0165
See application file for complete search history.

(56) References Cited

U.S. PATENT DOCUMENTS

| 2012/0035923 | A1* | 2/2012 | Krause | H04W 4/18 704/235 |
| 2013/0046443 | A1* | 2/2013 | Ahlers | B60K 35/00 701/48 |
| 2015/0105976 | A1* | 4/2015 | Shikii | G06F 3/0488 701/36 |
| 2016/0059864 | A1* | 3/2016 | Feit | B60K 35/00 701/36 |
| 2016/0212522 | A1* | 7/2016 | Lee | B60W 50/14 |

FOREIGN PATENT DOCUMENTS

| JP | 3824186 B2 | 9/2006 |
| JP | 2010-238209 A | 10/2010 |
| JP | 2013-154713 A | 8/2013 |
| JP | 2014-35613 A | 2/2014 |

OTHER PUBLICATIONS

Written Opinion of the International Search Authority issued for corresponding PCT/JP2016/054364.
International Search Report issued for corresponding PCT/JP2016/054364 application.
Written Opinion of the International Search Authority issued for corresponding PCT/JP2016/054364 application.
Extended European Search Report issued for corresponding European Patent Application No. 16752446.1-1219/3260816 dated Jul. 5, 2018.
Notice of Reasons for Refusal mailed by the Japan Patent Office dated Dec. 18, 2018 corresponding to Japanese Patent Application No. 2015-030705.

* cited by examiner

FIG. 7A

| NOTIFICATION INFORMATION | | DISPLAY LOCATION | | VOICE OUTPUT | |
|---|---|---|---|---|---|
| APP ID | NOTIFICATION CONTENT | HUD | DISPLAY PANEL | RECEPTION NOTIFICATION | TEXT |
| AGENT APP | TRAFFIC INFORMATION | ○ | × | ○ | ○ |
| | HEAVY RAIN AND FLOOD INFORMATION | ○ | × | ○ | ○ |
| | EARTHQUAKE INFORMATION | ○ | × | ○ | ○ |
| | FEE INFORMATION | × | ○ | ○ | × |
| | WEEKEND OUTING INFORMATION | × | ○ | ○ | ○ |
| SNS APP | UPDATE INFORMATION | × | × | × | × |
| | UPDATING INFORMATION | ○ | × | × | × |
| MESSENGER APP | UPDATE INFORMATION | × | × | × | × |
| | MESSAGE INFORMATION | ○ | × | × | × |
| EMAIL APP | UPDATE INFORMATION | × | × | × | × |
| | EMAIL INFORMATION | ○ | ○ | ○ | × |
| MUSIC APP | UPDATE INFORMATION | × | ○ | × | × |
| | MUSIC INFORMATION | ○ | × | ○ | × |
| NEWS APP | UPDATE INFORMATION | × | × | × | × |
| | NEWS UPDATING INFORMATION | × | ○ | ○ | ○ |

FIG. 7B

| NOTIFICATION INFORMATION | | DISPLAY LOCATION | | VOICE OUTPUT | |
|---|---|---|---|---|---|
| APP ID | NOTIFICATION CONTENT | HUD | DISPLAY PANEL | RECEPTION NOTIFICATION | TEXT |
| AGENT APP | TRAFFIC INFORMATION | ○ | × | × | × |
| | HEAVY RAIN AND FLOOD INFORMATION | ○ | × | × | × |
| | EARTHQUAKE INFORMATION | ○ | × | × | × |
| | FEE INFORMATION | × | ○ | × | × |
| | WEEKEND OUTING INFORMATION | × | ○ | × | × |
| SNS APP | UPDATE INFORMATION | × | × | × | × |
| | UPDATING INFORMATION | × | ○ | × | × |
| MESSENGER APP | UPDATE INFORMATION | × | × | × | × |
| | MESSAGE INFORMATION | × | ○ | × | × |
| EMAIL APP | UPDATE INFORMATION | × | × | × | × |
| | EMAIL INFORMATION | × | ○ | × | × |
| MUSIC APP | UPDATE INFORMATION | × | ○ | × | × |
| | MUSIC INFORMATION | ○ | × | × | × |
| NEWS APP | UPDATE INFORMATION | × | × | × | × |
| | NEWS UPDATING INFORMATION | × | ○ | × | × |

FIG. 7C

| NOTIFICATION INFORMATION | | DISPLAY LOCATION | | VOICE OUTPUT | |
|---|---|---|---|---|---|
| APP ID | NOTIFICATION CONTENT | HUD | DISPLAY PANEL | RECEPTION NOTIFICATION | TEXT |
| AGENT APP | TRAFFIC INFORMATION | ○ | × | ○ | ○ |
| | HEAVY RAIN AND FLOOD INFORMATION | ○ | × | ○ | ○ |
| | EARTHQUAKE INFORMATION | ○ | × | ○ | ○ |
| | FEE INFORMATION | × | ○ | ○ | ○ |
| | WEEKEND OUTING INFORMATION | × | ○ | ○ | ○ |
| SNS APP | UPDATE INFORMATION | × | × | × | × |
| | UPDATING INFORMATION | ○ | × | ○ | ○ |
| MESSENGER APP | UPDATE INFORMATION | × | × | × | × |
| | MESSAGE INFORMATION | ○ | ○ | ○ | ○ |
| EMAIL APP | UPDATE INFORMATION | × | × | × | × |
| | EMAIL INFORMATION | ○ | ○ | ○ | ○ |
| MUSIC APP | UPDATE INFORMATION | × | ○ | × | × |
| | MUSIC INFORMATION | ○ | × | × | × |
| NEWS APP | UPDATE INFORMATION | × | × | × | × |
| | NEWS UPDATING INFORMATION | × | ○ | ○ | ○ |

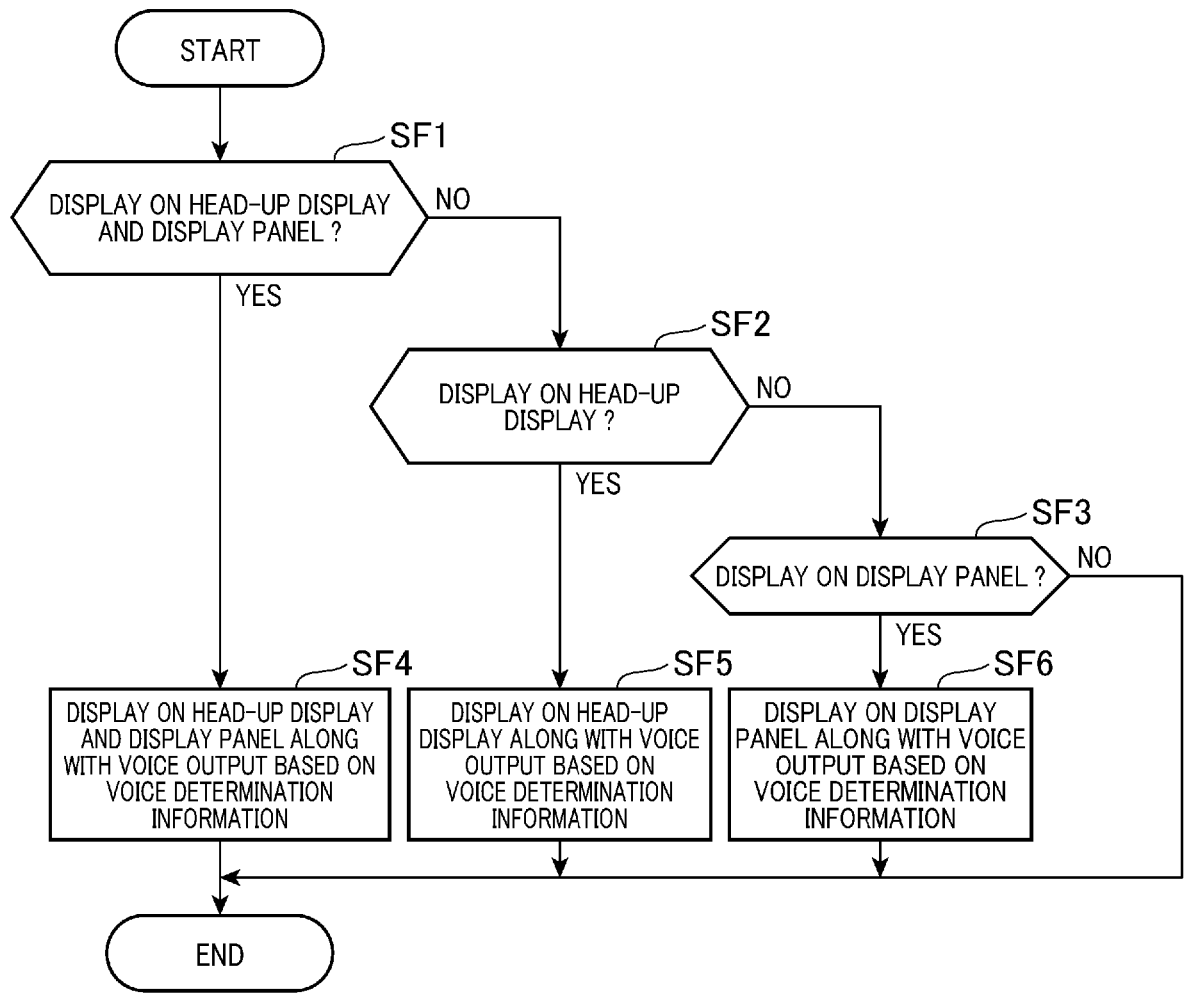

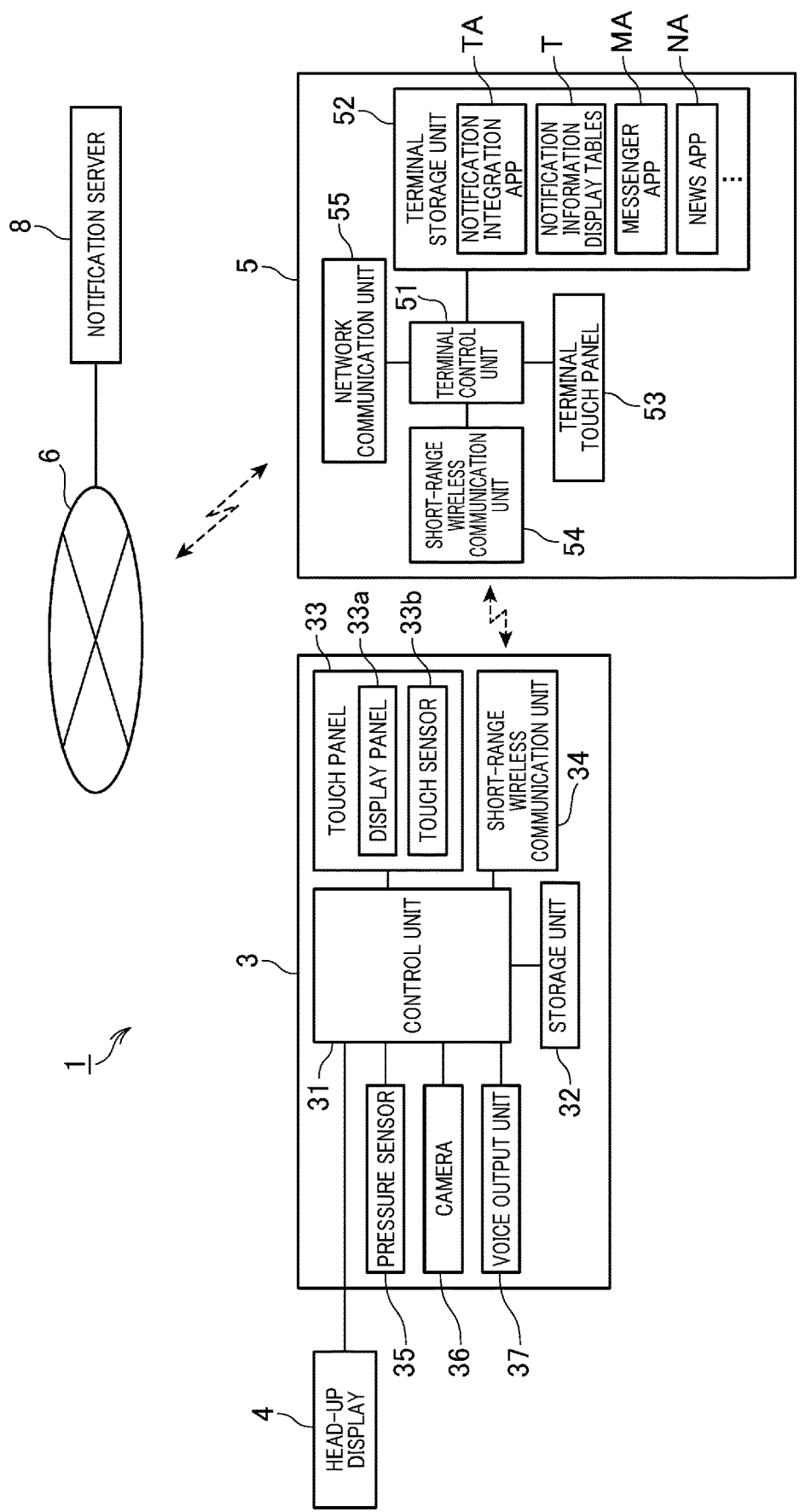

INFORMATION PROCESSING SYSTEM, ON-VEHICLE DEVICE, AND TERMINAL DEVICE FOR PRIVACY MANAGEMENT

TECHNICAL FIELD

The present invention relates to an information processing system, an on-vehicle device, and a terminal device.

BACKGROUND ART

Background art of the present technical field includes Japanese Patent Laid-Open No. 2010-238209 (Patent Literature 1). The following is described in this publication. "A center includes a cautious traveling location DB associating and storing information of environments in which vehicles are driven and information of cautious traveling locations where the vehicles need to travel with caution. An on-vehicle device acquires and transmits positional information and environmental information of a vehicle to the center. The center specifies, from the cautious traveling location DB, the cautious traveling location information corresponding to the positional information and the environmental information received from the on-vehicle device and distributes the cautious traveling location information to the on-vehicle device. The on-vehicle device notifies a driver of the cautious traveling location information distributed from the center by displaying the cautious traveling location information on a display or by outputting reading voice from a speaker."

CITATION LIST

Patent Literature

Patent Literature 1: Japanese Patent Laid-Open No. 2010-238209

SUMMARY OF INVENTION

Technical Problem

By the way, a vehicle may be provided with display devices including a head-up display connected to a navigation device and a display panel included in the navigation device. Although the display devices display information to notify passengers including the driver of the information, display on the display devices according to information to be notified is not considered in Patent Literature 1.

Accordingly, an object of the present invention is to provide an information processing system, an on-vehicle device, and a terminal device that display information on display devices according to information to be notified.

Solution to Problem

To attain the object, an information processing system includes: an on-vehicle device mounted on a vehicle; a terminal device that can communicate with the on-vehicle device; and an information processing device that can communicate with the terminal device, wherein the on-vehicle device is connected to a head-up display as a display device that allows a driver to visually recognize display of displayed information and includes a display panel as a display device that allows the driver and a passenger other than the driver to visually recognize display of displayed information, the terminal device receives notification information for notifying predetermined information, transmits the notification information to the on-vehicle device, and transmits notification related information regarding the notification information to the information processing device, the information processing device determines the display device that displays information based on the notification information in the on-vehicle device based on the notification related information received from the terminal device and directly transmits display location information indicating the determined display device to the on-vehicle device or transmits the display location information to the on-vehicle device through the terminal device, and the on-vehicle device receives the notification information from the terminal device, receives the display location information from the information processing device, and displays the information based on the notification information on the display device indicated by the received display location information.

Advantageous Effect of Invention

According to the present invention, information can be displayed on display devices according to information to be notified.

BRIEF DESCRIPTION OF DRAWINGS

FIGS. 7A to 7C are diagrams showing examples of notification information display tables.

FIG. 8 is a flow chart showing an action of a navigation device.

FIG. 11 is a diagram showing a configuration of an information processing system according to a third embodiment.

DESCRIPTION OF EMBODIMENTS

<First Embodiment>

Figure 1:
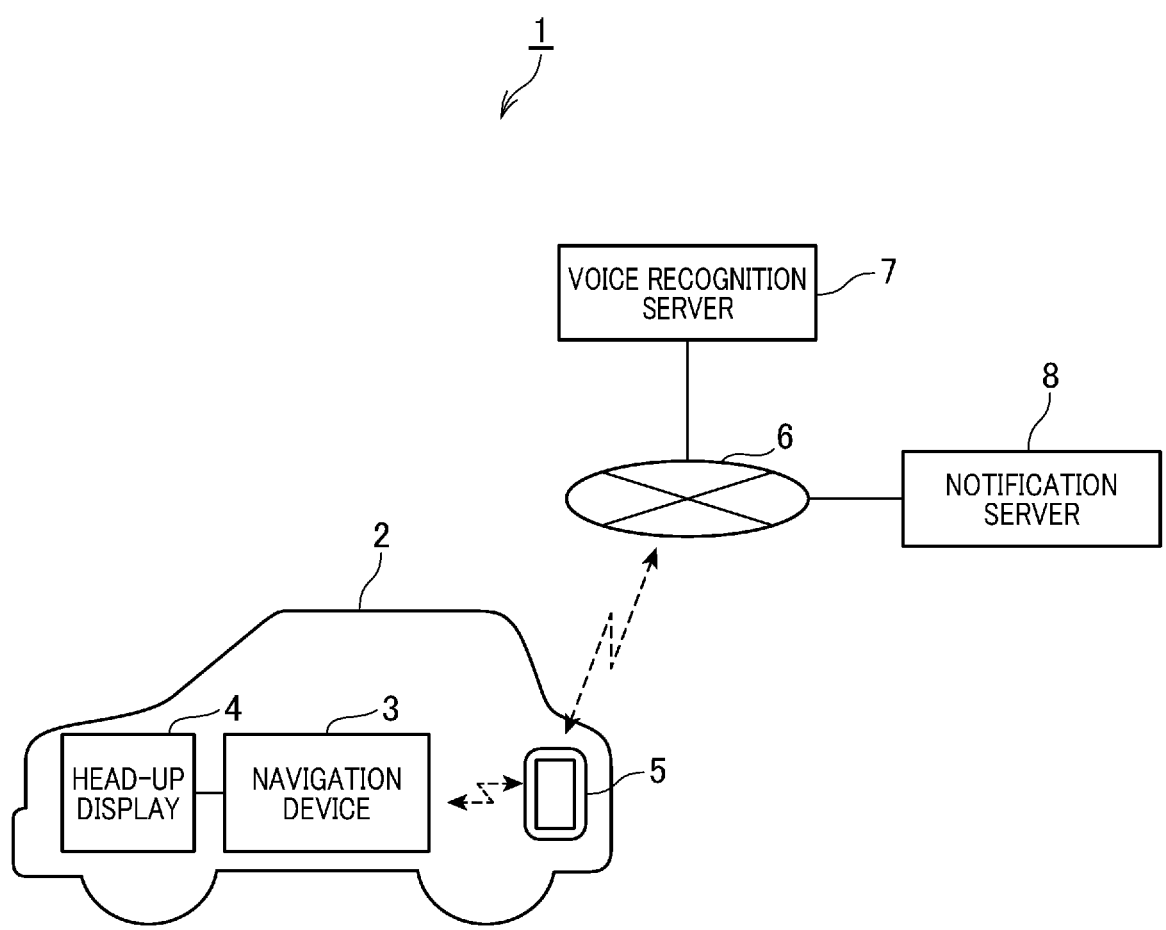
FIG. 1 is a diagram showing a configuration of an information processing system according to a first embodiment.

FIG. 1 is a diagram showing a configuration of an information processing system 1 according to a first embodiment.

As shown in FIG. 1, the information processing system 1 includes: a navigation device 3 (on-vehicle device) mounted on a vehicle 2; a mobile terminal 5 (terminal device) connected to a network 6 including the Internet, a telephone network, and the like; and a control server 7 (information processing device) connected to the network 6.

A notification server 8 is connected to the network 6. The notification server 8 is a server that provides a notification system for notifying the mobile terminal 5 of predetermined information.

The mobile terminal 5 is a portable terminal mounted on the vehicle 2 and possessed by a driver and is, for example, a smartphone or a tablet terminal. The mobile terminal 5 is connected to the navigation device 3 through short-range wireless communication of Bluetooth (registered trademark) or the like. Furthermore, the mobile terminal 5 can be connected to the network 6. A notification app that is an application for using the notification system provided by the notification server 8 is installed on the mobile terminal 5.

The control server 7 is a server device with the mobile terminal 5 serving as a client. The control server 7 communicates with the mobile terminal 5 to execute a predetermined process according to a request from the mobile terminal 5 as a client and transmits a processing result to the mobile terminal 5.

The navigation device 3 is a device that executes functions of displaying a map, searching a route to a destination, guiding a route, and the like according to operation by the driver and a passenger other than the driver. The navigation device 3 includes a display panel 33*a* described later and displays various information on the display panel 33*a*.

The display panel 33*a* is provided at a position of a center console or the like where the driver and the passenger other than the driver riding on the vehicle 2 can visually recognize the information displayed on the display panel 33*a*.

A head-up display 4 is connected to the navigation device 3. The head-up display 4 is a display device that displays information for supporting the drive of the driver based on the traveling road or traffic information, such that the information is displayed over the scenery in front as viewed from the driver's seat through the windshield. The head-up display 4 is a combiner type display device including a semitransparent screen called a "combiner" on the windshield side of the vehicle 2 and configured to use the combiner to display information. The head-up display 4 projects an image through the combiner such that a virtual image is formed at the focal point of the line of sight of the person sitting on the driver's seat. Therefore, only the driver can visually recognize the information displayed by the head-up display 4.

Figure 2:
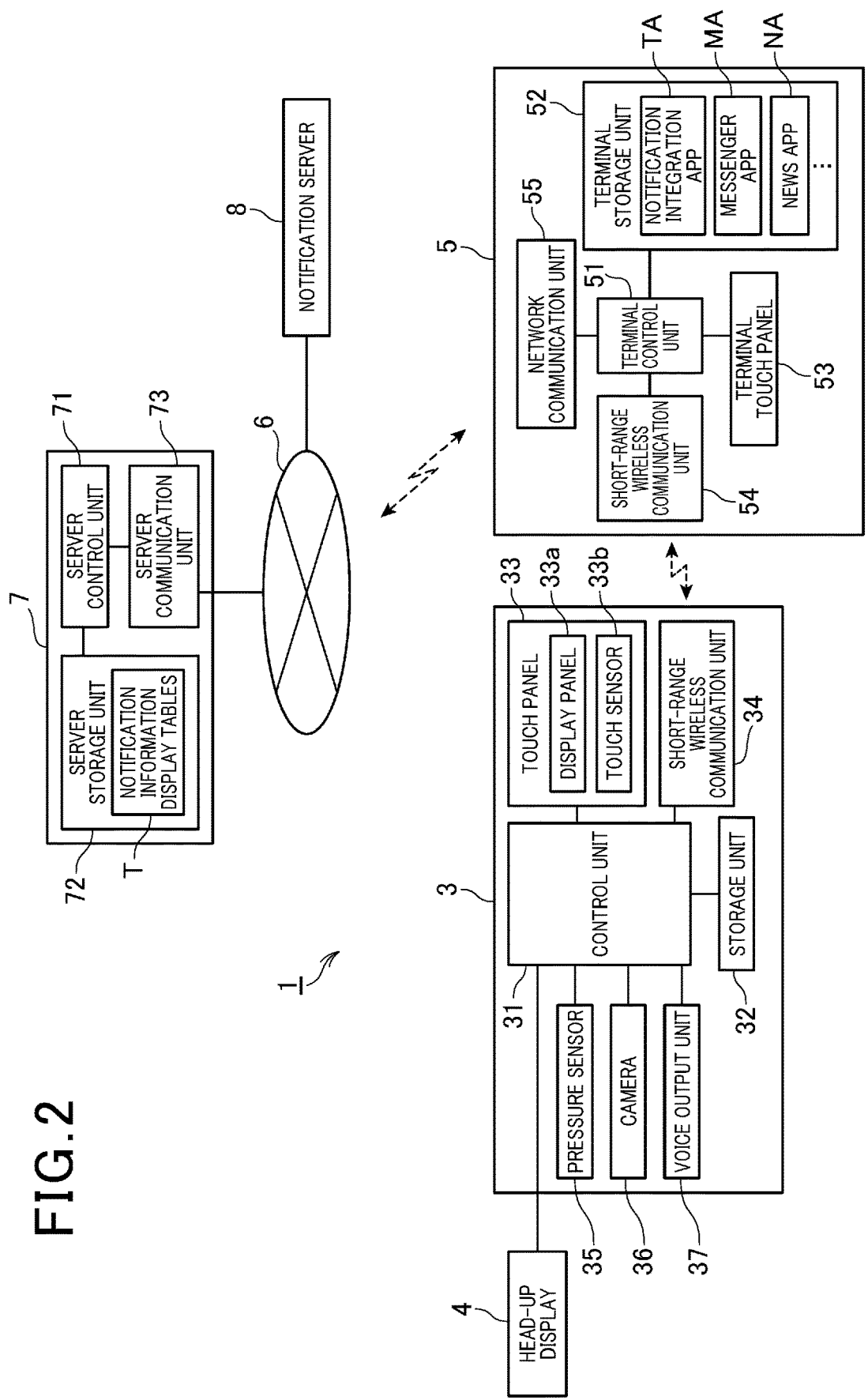
FIG. 2 is a functional block diagram of the information processing system.

FIG. 2 is a functional block diagram of the information processing system 1 according to the present embodiment.

As shown in FIG. 2, the navigation device 3 includes a control unit 31, a storage unit 32, a touch panel 33, a short-range wireless communication unit 34, a pressure sensor 35, a camera 36, and a voice output unit 37.

The control unit 31 includes a CPU, a ROM, a RAM, other control circuits, and the like and controls the components of the navigation device 3.

The storage unit 32 includes a non-volatile memory, such as a hard disk and an EEPROM, and stores data in a rewritable manner. Furthermore, the storage unit 32 stores a plurality of applications described later. Furthermore, the storage unit 32 stores map data. The map data includes: information regarding nodes indicating intersections and other connection points on the road network; information regarding links indicating road sections between nodes; and information regarding administrative districts on the map and names of roads, facilities, intersections, and the like. Furthermore, the storage unit 32 stores drawing data for displaying information on the head-up display 4 connected to the control unit 31 and the display panel 33*a* described later.

The touch panel 33 includes the display panel 33*a* and a touch sensor 33*b*. The display panel 33*a* includes a panel, such as a liquid crystal display and an EL (Electro Luminescent) display, and displays various information on the display panel 33*a* under the control of the control unit 31. The touch sensor 33*b* is arranged over the display panel 33*a* and is configured to detect touch operation of the user and output a signal indicating the touch operation to the control unit 31. The touch panel 33 is provided at a position of the center console or the like where the passenger other than the driver riding on the vehicle 2 can visually recognize the information displayed on the display panel 33*a*.

The short-range wireless communication unit 34 establishes a communication link to the mobile terminal 5 according to the communication standard regarding the short-range wireless communication of Bluetooth or the like under the control of the control unit 31 and communicates with the mobile terminal 5.

The pressure sensor 35 is provided on each seat of the vehicle and outputs a different signal to the control unit 31 according to whether a passenger is seated on each seat. The control unit 31 uses a function of an in-vehicle situation monitoring app KA described later to detect presence/absence of the passenger in each seat provided on the vehicle 2 based on the signal input from each pressure sensor 35.

The camera 36 is a photographing device provided at a position that allows photographing at least the inside of the vehicle 2. The camera 36 executes photographing at a predetermined cycle (for example, every 100 ms) according to the control of the control unit 31, generates photographed image data based on the photographing result, and outputs the photographed image data to the control unit 31. The control unit 31 uses the function of the in-vehicle situation monitoring app KA described later to acquire and analyze the photographed image data.

The voice output unit 37 includes a speaker not shown and outputs, from the speaker, voice based on a voice signal input from the control unit 31.

As shown in FIG. 2, the head-up display 4 is connected to the navigation device 3 and displays information for supporting the drive of the driver based on the traveling road or traffic information under the control of the control unit 31.

As shown in FIG. 2, the mobile terminal 5 includes a terminal control unit 51, a terminal storage unit 52, a terminal touch panel 53, a short-range wireless communication unit 54, and a network communication unit 55.

The terminal control unit 51 includes a CPU, a ROM, a RAM, other peripheral circuits, and the like and controls the components of the mobile terminal 5.

The terminal storage unit 52 includes a non-volatile memory and stores various data. The terminal storage unit 52 stores a notification integration app TA. The notification integration app TA will be described later. Furthermore, the terminal storage unit 52 stores applications as notification apps other than the notification integration app TA. The notification apps will be described later.

The terminal touch panel 53 displays various information under the control of the terminal control unit 51 and detects touch operation of the user to output the touch operation to the terminal control unit 51.

The short-range wireless communication unit 54 establishes a communication link to the navigation device 3 according to a communication standard regarding predetermined short-range wireless communication under the control of the terminal control unit 51 and communicates with the navigation device 3 according to the communication standard.

The network communication unit 55 communicates with a device connected to the network 6 according to a predetermined communication standard under the control of the terminal control unit 51.

As shown in FIG. 2, the control server 7 includes a server control unit 71, a server storage unit 72, and a server communication unit 73.

The server control unit 71 includes a CPU, a ROM, a RAM, other peripheral circuits, and the like and controls the components of the control server 7.

The server storage unit 72 stores a control program executed by the server control unit 71 and data processed by the server control unit 71. Furthermore, the server storage unit 72 stores a plurality of apps described later. Furthermore, the server storage unit 72 stores a plurality of notification information display tables T according to passenger information described later. The notification information display tables T will be described later.

The server communication unit 73 communicates with a device connected to the network 6 according to a predetermined communication standard under the control of the server control unit 71.

By the way, the mobile terminal 5 in the information processing system 1 of the present embodiment executes actions of receiving, from the notification server 8, notification information for notifying predetermined information and transmitting notification related information regarding the notification information to the control server 7. The action is enabled by the function of the notification integration app TA stored in the terminal storage unit 52.

The notification integration app TA is an application for processing the notification information received by the notification app and is installed in advance on the mobile terminal 5.

Hereinafter, the notification apps installed on the mobile terminal 5 according to the present embodiment will be specifically described, and notification information received by each notification app and notification content of the notification information will be described.

Figure 3:
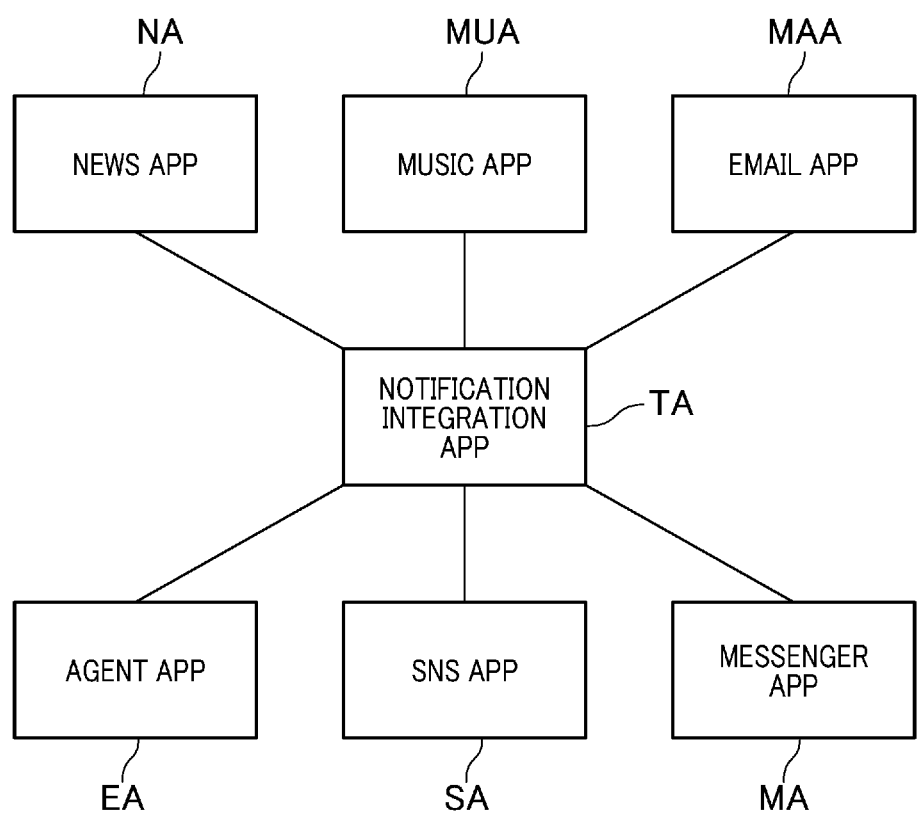
FIG. 3 is a diagram schematically showing a relationship between notification apps and a notification integration app.

FIG. 3 is a diagram schematically showing a relationship between the notification apps installed on the mobile terminal 5 and the notification integration app TA.

In the following description using FIG. 3, functions of various applications will be described by assuming that the applications are the subjects that execute various processes.

As shown in FIG. 3, an agent app EA is installed on the mobile terminal 5. The agent app EA is, for example, an application provided by a carrier of the mobile terminal 5 and is an application for using a system provided by an agent server. The agent server is, for example, a server that provides a system for notifying notification information that is information beneficial for the user who owns the mobile terminal 5. The user can install the agent app EA on the mobile terminal 5 to acquire notification information that is information beneficial for the user through a push notification from the agent server. Here, examples of the notification content of the notification information acquired by the agent app EA include traffic information, heavy rain and flood information, earthquake information, fee information, and weekend outing information.

The traffic information is information related to the traffic, such as traffic jams, lane restrictions, road closure, and traffic restrictions. Since the traffic information is information regarding the travel of the vehicle 2, it is desirable that the driver who drives the vehicle 2 acquire the information regardless of the presence/absence of the passenger other than the driver.

The heavy rain and flood information is information related to the weather of a region set in advance, a region where the vehicle 2 is traveling, or the like. The heavy rain and flood information is information related to the weather of the region where the vehicle 2 is traveling and includes information regarding the travel of the vehicle 2. Therefore, it is desirable that the driver acquire the heavy rain and flood information regardless of the presence/absence of the passenger other than the driver.

The earthquake information is information of the epicenter of an earthquake, an earthquake warning, and traffic restrictions due to the earthquake and includes information related to the travel of the vehicle 2. Therefore, it is desirable that the driver acquire the earthquake information regardless of the presence/absence of the passenger other than the driver.

The fee information is information related to the use fee of the mobile terminal 5 owned by the driver. Since the fee information is not information related to the travel of the vehicle 2, the fee information is information that may not be acquired by the driver.

The weekend outing information is information such as an event of a region held on a weekend near the destination and is information that may not be acquired by the driver because the information is not related to the travel of the vehicle 2. However, the weekend outing information includes beneficial information of the destination, and it is desirable that at least the passenger other than the driver acquire the information.

Furthermore, as shown in FIG. 3, an SNS app SA is installed on the mobile terminal 5. The SNS app SA is an application for using an SNS provided by an SNS server as the notification server 8. The SNS server is, for example, a server that provides an SNS in which a text can be posted. The user who owns the mobile terminal 5 can install the SNS app SA on the mobile terminal 5 to write a post or acquire a post of another user using the SNS app SA. Furthermore, the user can acquire notification information from the SNS server through a push notification. Here, examples of the notification content of the notification information acquired by the SNS app SA include update information and updating information.

The update information is information related to version upgrade of the SNS app SA. The update information is information that does not have to be immediately acquired because the driver cannot perform the update work of the application during the drive of the vehicle 2. From this point of view, the update information is information less necessary to be acquired by the driver and the passenger other than the driver.

The updating information is information for notifying a post when a person who uses the SNS to communicate with the driver posts a photograph, a text, or the like. The post may include private information of the driver, and it is desirable that only the driver acquire the updating information. By the way, depending on the post, it may be preferable to display a photograph, a long text, or the like on the display panel 33a to allow surely acquiring the notification content for the reasons of the display area and the like. However, the passenger other than the driver can also visually recognize the content displayed on the display panel 33a, and in this case, the state of the passenger other than the driver needs to be considered. Therefore, the updating information is displayed on the head-up display 4 to allow only the driver to acquire the updating information when there is a passenger other than the driver. The updating information is displayed on the display panel 33a to allow surely acquiring the notification content when the passenger other than the driver is sleeping. The updating information is output by voice to allow surely acquiring the notification content when there is no passenger other than the driver.

Furthermore, as shown in FIG. 3, a messenger app MA is installed on the mobile terminal 5. The messenger app MA is an application for using a system provided by a messenger server as the notification server 8. The messenger server is, for example, a server that provides a system for exchanging a message with a predetermined user in a chat format. The user who owns the mobile terminal 5 can install the messenger app MA on the mobile terminal 5 to exchange a message with a predetermined user in a chat format. Furthermore, the user can acquire notification information from the messenger server through a push notification. Here, examples of the notification content of the notification information acquired by the messenger app MA include update information and message information.

The update information is information related to version upgrade of the messenger app MA and is information less necessary to be acquired by the passengers including the driver.

The message information is information related to the message. The message information is addressed to the driver and is private information. That is, it is desirable that only the driver acquire the message information. By the way, a format of the message in the message information includes emoji in addition to text. Therefore, it is preferable to display the message based on the message information on the display panel 33a for the reasons of the display area, the resolution, and the like. However, the passenger other than the driver can also visually recognize the content displayed on the display panel 33a, and in this case, the state of the passenger other than the driver needs to be considered. Therefore, the message based on the message information is displayed on the head-up display 4 to allow only the driver to acquire the message when there is a passenger other than the driver. The message is displayed on the display panel 33a to allow surely acquiring the notification content when the passenger other than the driver is sleeping. The message is output by voice along with the display to allow surely acquiring the notification content when there is no passenger other than the driver.

Furthermore, as shown in FIG. 3, an email app MAA is installed on the mobile terminal 5. The email app MAA is an application for using a system provided from an email server as the notification server 8. The email server is a server that provides a system for transmitting and receiving email. The user who owns the mobile terminal 5 can install the messenger app MA on the mobile terminal 5 to acquire notification information from the email server through a push notification. Here, examples of the notification content of the notification information acquired by the email app MAA include update information and email information.

The update information is information related to version upgrade of the email app MAA and is information less necessary for the passengers including the driver.

The email information is information related to email. Although the email information is private information mainly addressed to the driver, the email information may include information beneficial for the passenger other than the driver such as an advertisement. Therefore, although it is desirable that the driver mainly acquire the email information, the email information is displayed to allow the passengers including the driver to acquire the fact that the email information is transmitted when there is a passenger other than the driver. The email information is displayed on the display panel 33a to allow surely acquiring the notification content when the passenger other than the driver is sleeping. The email information is output by voice along with the display to allow surely acquiring the notification content when there is no passenger other than the driver.

Furthermore, as shown in FIG. 3, a music app MUA is installed on the mobile terminal 5. The music app MUA is an application for using a system provided by a music server as the notification server 8. The music server is a server that provides a system for playing music distributed by the music server. The user who owns the mobile terminal 5 can install the music app MUA to play, for example, music distributed from the music server. Furthermore, the user can acquire notification information from the music app MUA through a push notification. Here, examples of the notification content of the notification information acquired by the music app MUA include update information and music information.

Since the update information is not information related to the travel of the vehicle 2, the update information is information less necessary for the driver. However, the music app MUA can be updated based on the update information to play new music. From this point of view, the update information is information beneficial for at least the passenger other than the driver.

The music information is information of the song title, the artist name, and the like of the music being played. The music information is information that can be acquired by operating the mobile terminal 5. Therefore, it is desirable that only the driver who has difficulty in operating the mobile terminal 5 acquire the music information when the music app MUA receives the music information.

Furthermore, as shown in FIG. 3, a news app NA is installed on the mobile terminal 5. The news app NA is an application for using a system provided by a news server as the notification server 8. The news server is, for example, a server that provides a system for transmitting information regarding news. The user who owns the mobile terminal 5 can install the news app NA to acquire notification information from the news server through a push notification. Here, examples of the notification content of the notification information acquired by the news app NA include update information and news updating information.

The update information is information related to version upgrade of the news app NA and is information less necessary for the driver and the passenger other than the driver.

The news updating information is information related to latest events of society, politics, and the like. Although the news updating information is information less necessary for the driver because the news updating information is not information related to the travel of the vehicle 2, the news updating information includes beneficial information such as latest events, and it is desirable that the passengers including the driver acquire the information.

As shown in FIG. 3, the notification integration app TA uses an API (Application Programing Interface) with a function of exchanging information with another application to process the notification information received by the notification app. When the notification integration app TA acquires the notification information, the notification integration app TA transmits notification related information regarding the notification information to the control server 7. The notification related information includes application information indicating the application that has acquired the notification information and notification content information indicating the notification content of the notification information.

For example, when the agent app EA receives and processes notification information in which the notification content is the traffic information, the notification integration app TA uses a predetermined function of the API to acquire the notification information from the notification integration app TA. Next, the notification integration app TA generates application information, which includes identification information (hereinafter, expressed as "app ID") for uniquely identifying the agent app EA and notification related information including the notification content information indicating the traffic information, and transmits the information to the control server 7.

Based on the configuration, the devices of the information processing system 1 according to the present embodiment are triggered by the transmission of the notification information from the notification server 8 to the mobile terminal 5 to execute the following actions.

Figure 4:
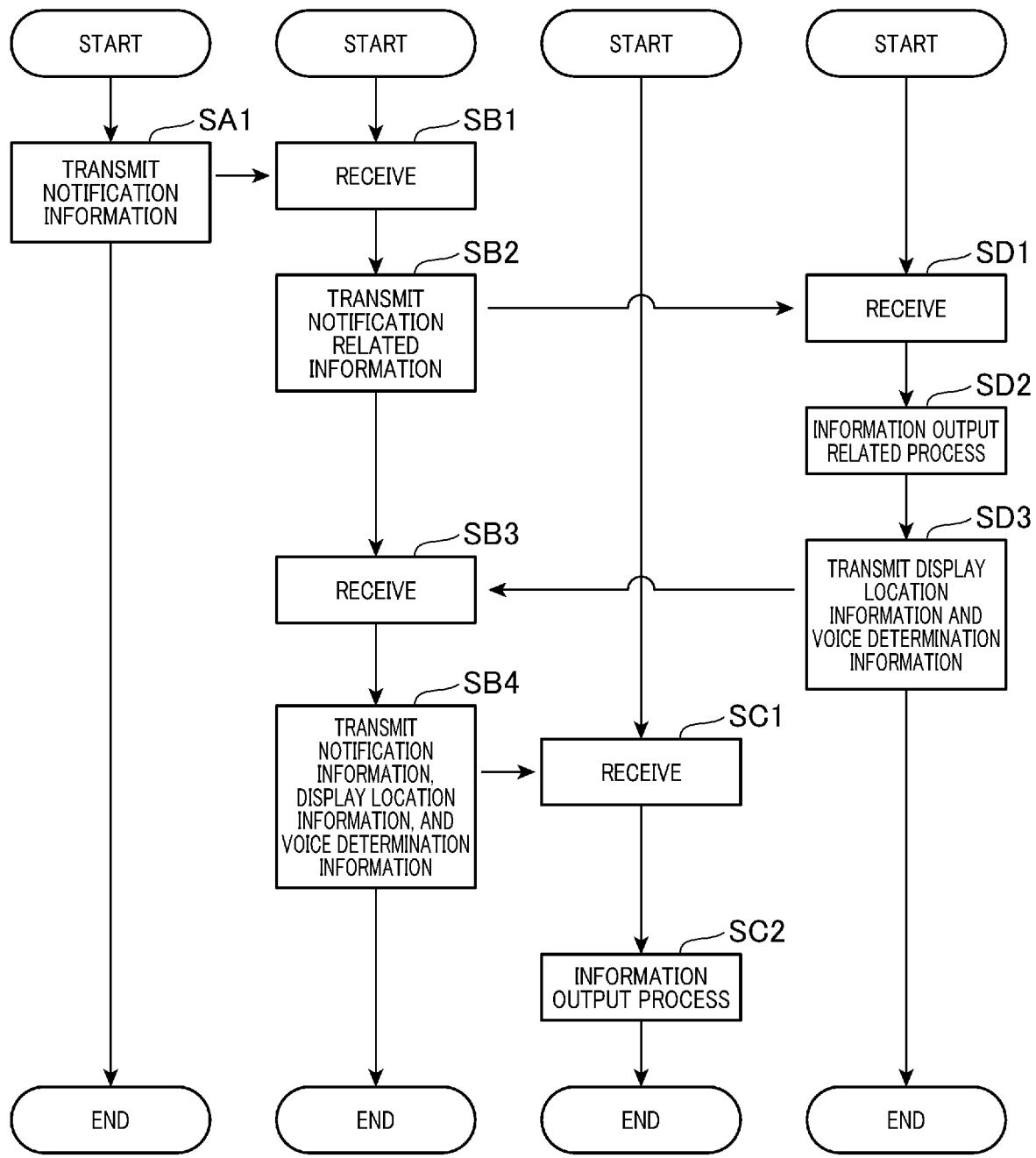
FIGS. 4A to 4D are flow charts showing actions of the information processing system.

FIGS. 4A to 4D are flow charts showing actions of the information processing system 1 according to the present embodiment. FIG. 4A shows an action of the notification server 8. FIG. 4B shows an action of the mobile terminal 5. FIG. 4C shows an action of the navigation device 3. FIG. 4D shows an action of the control server 7.

The actions of the information processing system 1 shown in FIGS. 4A to 4D can be executed by functions of applications installed on the devices.

Figure 5:
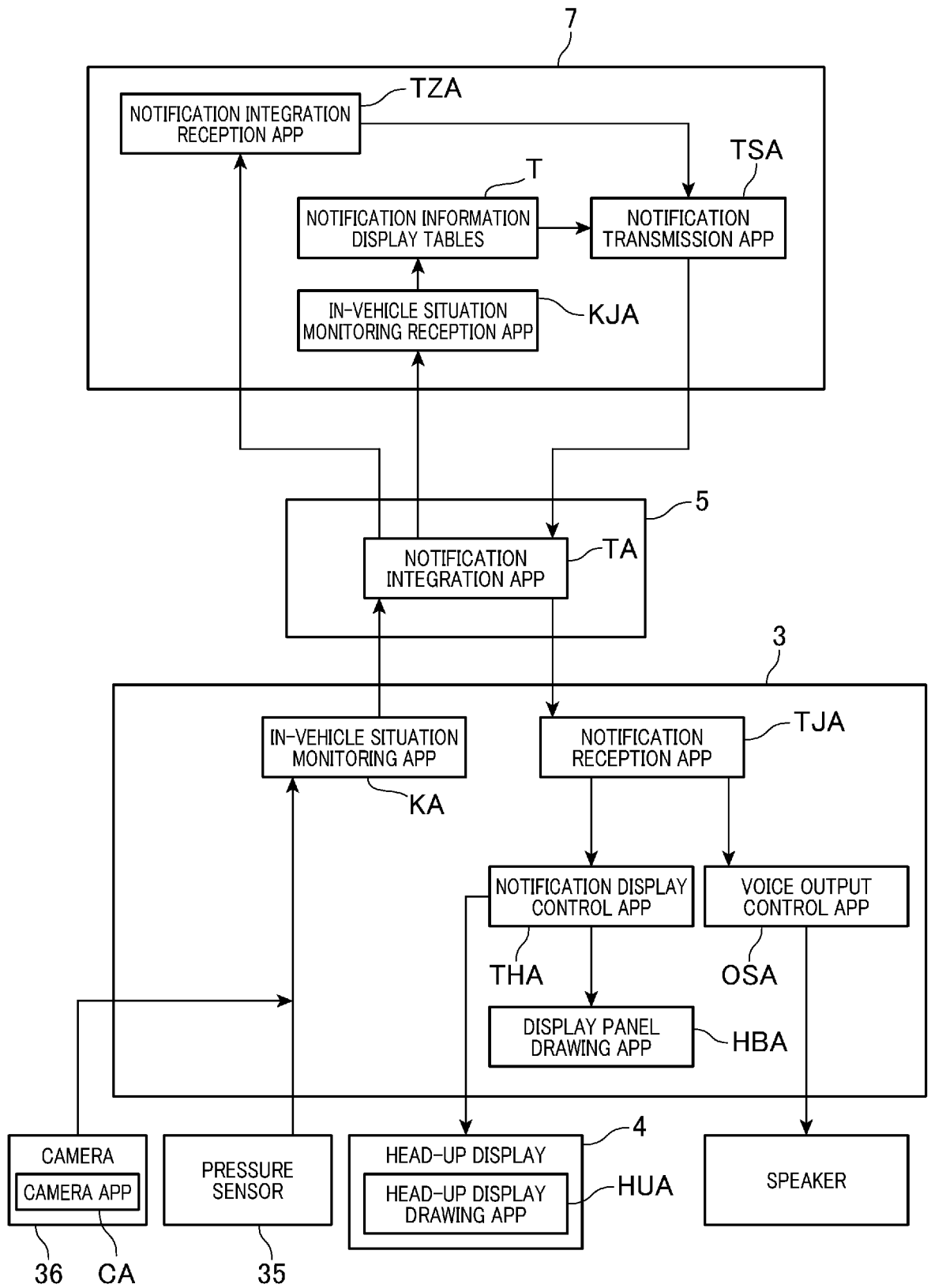
FIG. 5 is a diagram showing flows of data between applications installed on devices of the information processing system.

FIG. 5 is a diagram showing applications installed on the devices of the information processing system 1 and showing flows of data between the applications.

As shown in FIG. 5, the notification integration app TA is installed on the mobile terminal 5. Furthermore, a notification integration reception app TZA, a notification transmission app TSA, and an in-vehicle situation monitoring reception app KJA are installed on the control server 7. Furthermore, a notification reception app TJA, the in-vehicle situation monitoring app KA, a voice output control app OSA, a notification display control app THA, and a display panel drawing app HBA are installed on the navigation device 3.

Hereinafter, the functions of the applications installed on the devices will be appropriately described with reference to FIG. 5, and the flow charts of FIGS. 4A to 4D will be used to describe the actions of the devices of the information processing system 1.

Here, the following is assumed. That is, it is assumed that the control unit 31 of the navigation device 3 generates passenger information indicating the situation of the passenger other than the driver in the vehicle 2 based on a detection signal and photographed image data acquired from the pressure sensor 35 and the camera 36 and transmits the passenger information to the control server 7. More specifically, the control unit 31 uses the function of the in-vehicle situation monitoring app KA to generate the passenger information and transmits the passenger information to the control server 7 through the mobile terminal 5. The in-vehicle situation monitoring app KA is an application that generates passenger information including information of the presence/absence of the passenger other than the driver in the vehicle 2 based on photographed image data on the basis of a photographing result of photographing using a function of a camera app CA and based on a detection signal of the pressure sensor 35 and that transmits the passenger information to the in-vehicle situation monitoring reception app KJA described later installed on the control server 7. Here, the camera app CA is an application that controls the camera 36.

The passenger information includes information of the situation of the passenger, the information including information of the presence/absence of the passenger other than the driver in the vehicle 2 and information of whether the passenger is sleeping when there is a passenger. The function of the in-vehicle situation monitoring app KA is used to generate the information of the presence/absence of the passenger other than the driver based on, for example, the detection signal detected by the pressure sensor 35. In this case, when the control unit 31 uses the function of the in-vehicle situation monitoring app KA and acquires a detection signal of a seat other than the driver's seat, the control unit 31 detects that there is a passenger other than the driver and generates information indicating the existence of the passenger.

The function of the in-vehicle situation monitoring app KA is used to generate the information of whether the passenger is sleeping based on, for example, the photographed image data based on the photographing result of the camera 36. The control unit 31 uses the function of the in-vehicle situation monitoring app KA to analyze the acquired photographed image data to detect a face area indicating the position of the face of the passenger other than the driver photographed in the photographed image data and detects an eye area indicating the positions of the eyes of the passenger other than the driver from the detected face area. The face area and the eye area can be detected by using an existing technique such as pattern matching using templates indicating faces and eyes. Furthermore, the control unit 31 uses the function of the in-vehicle situation monitoring app KA to analyze image data corresponding to the detected eye area and determines whether the passenger other than the driver is sleeping. For example, the control unit 31 detects that the eyes of the passenger other than the driver are closed based on pattern matching using templates of closed eyes, detection of the white of the eyes using white color detection, or the like. The control unit 31 also tracks the eye area and determines that the passenger other than the driver is sleeping when the time that the eyes of the passenger other than the driver are closed exceeds a predetermined period. Then, the control unit 31 uses the function of the in-vehicle situation monitoring app KA to detect that the situation of the passenger is a situation in which the passenger is sleeping based on the determination.

Note that the method of detecting the situation of the passenger is not limited to the method described above.

Returning to the description of the flow charts of FIGS. 4A to 4D, the notification server 8 transmits notification information for notifying predetermined information to the mobile terminal 5 in FIG. 4A (step SA1).

Next, in FIG. 4B, the terminal control unit 51 of the mobile terminal 5 uses the function of the notification app stored in the terminal storage unit 52 to receive the notification information (step SB1). Next, the terminal control unit 51 uses the function of the notification integration app TA to transmit, to the control server 7, notification related information regarding the notification information received by the function of the notification app (step SB2).

For example, when the notification server 8 is the messenger server, and the messenger app MA receives notification information in which the notification content is the message information from the messenger server, the terminal control unit 51 uses the function of the messenger app MA to apply processing to the notification information, such as a process of displaying the message. Along with the processing of the notification information, the terminal control unit 51 uses the function of the notification integration app TA to acquire the notification information received by the messenger app MA. Next, the terminal control unit 51 uses the function of the notification integration app TA to generate application information including the app ID for identifying the messenger app MA and the notification content information indicating that the notification content is the message information based on the acquired notification information. Next, the terminal control unit 51 uses the function of the notification integration app TA to transmit the app ID and the notification content information to the control server 7.

In FIG. 4D, the server control unit 71 of the control server 7 uses the function of the notification integration reception app TZA to receive the notification related information (step SD1).

Next, the server control unit 71 uses the functions of the notification transmission app TSA and the in-vehicle situation monitoring reception app KJA to execute an information output related process based on the notification information display tables T stored in the server storage unit 72 and the notification related information received by the function of the notification integration reception app TZA (step SD2).

Here, the information output related process will be described in detail.

Figure 6:
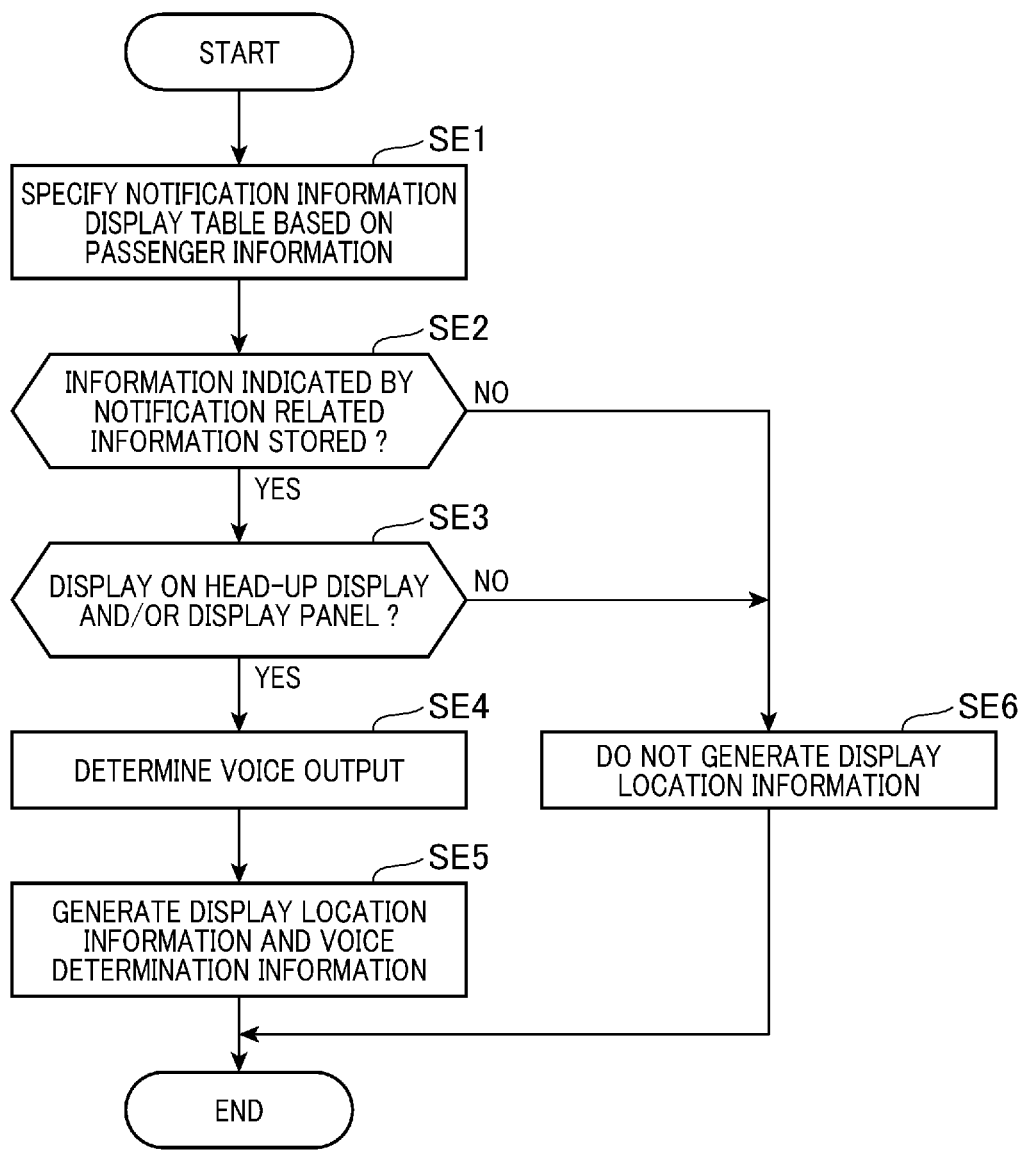
FIG. 6 is a flow chart showing an action of a control server.

FIG. 6 is a flow chart showing an action of the control server 7 in the information output related process.

The server control unit 71 of the control server 7 uses the function of the in-vehicle situation monitoring reception app KJA to receive the passenger information. The server control unit 71 uses the function of the in-vehicle situation monitoring reception app KJA to detect the situation of the passenger other than the driver based on the received passenger information and specifies the notification information display table T corresponding to the detected situation of the passenger (step SE1). As described, the server storage unit 72 stores a plurality of notification information display tables T according to the situation of the passenger. The server storage unit 72 in the present example stores the notification information display tables T corresponding to three situations of the passenger: a situation in which there is a passenger other than the driver in the vehicle 2; a situation in which the passenger other than the driver is sleeping; and a situation in which there is no passenger other than the driver in the vehicle 2.

FIGS. 7A to 7C are diagrams showing examples of the notification information display tables T. FIG. 7A shows a notification information display table T1 of the situation in which there is a passenger other than the driver in the vehicle 2. FIG. 7B shows a notification information display table T2 of the situation in which the passenger other than the driver is sleeping. FIG. 7C shows a notification information display table T3 of the situation in which there is no passenger other the driver in the vehicle 2.

One record of each notification information display table T shown in FIGS. 7A to 7C includes a notification information field F1, a display location field F2, and a voice output field F3.

The notification information field F1 includes an app ID field F11 and a notification content field F12. The app ID of each application installed on the mobile terminal 5 is stored in the app ID field F11. The notification content field F12 stores the notification content of the notification information received by each application. For example, the agent app EA receives fives pieces of notification information with different notification content, and five records are stored in the record of the agent app EA.

The display location field F2 includes a head-up display field F21 and a display panel field F22. The head-up display field F21 stores information indicating whether to display the information based on the notification information on the head-up display 4. "O" indicates that the information is displayed, and "X" indicates that the information is not displayed. The display panel field F22 stores information indicating whether to display the information based on the notification information on the display panel 33a. As in the head-up display field F21, "O" indicates that the information is displayed, and "X" indicates that the information is not displayed.

The voice output field F3 includes a reception notification field F31 and a text field F32. The reception notification field F31 stores information indicating whether the notification app corresponding to the app ID outputs voice indicative of the reception of the notification information (hereinafter, expressed as reception notification). "O" indicates that the voice is output, and "X" indicates that the voice is not output. The text field F32 stores information indicating whether to output the voice of the information based on the notification information. "O" indicates that the voice is output, and "X" indicates that the voice is not output.

Returning to the description of the flow chart of FIG. 6, the server control unit 71 uses the function of the in-vehicle situation monitoring reception app KJA to detect the situation of the passenger based on the passenger information transmitted from the navigation device 3. Then, the server control unit 71 uses the function of the in-vehicle situation monitoring reception app KJA to specify the notification information display table T corresponding to the detected situation of the passenger from the three notification information display tables T stored in the server storage unit 72. As described, the server control unit 71 detects one of the three situations based on the passenger information: the case in which there is a passenger other than the driver; the case in which the passenger other than the driver is sleeping; and the case in which there is no passenger other than the driver.

Here, the information output related process in the three cases will be described.

<When There Is Passenger Other than Driver>

When the server control unit 71 uses the function of the in-vehicle situation monitoring reception app KJA and detects that the situation of the passenger is the situation in which there is a passenger other than the driver based on the passenger information, the server control unit 71 specifies the notification information display table T1 from the notification information display tables T stored in the server storage unit 72 (step SE1).

Next, the server control unit 71 uses the function of the notification transmission app TSA to refer to the notification information display table T1 and determines whether the information indicated by the notification related information received from the mobile terminal 5 is stored (step SE2). More specifically, the server control unit 71 uses the function of the notification transmission app TSA to determine whether the information indicated by the application information and the notification content information included in the notification related information is stored in the notification information display table T1. That is, the server control unit 71 determines whether the app ID indicated by the application information and the notification content indicated by the notification content information are stored in the notification information display table T1.

For example, when the notification server 8 is the messenger server, and the messenger app MA receives the notification information in which the notification content is the message information from the messenger server, the server control unit 71 uses the function of the notification integration reception app TZA to receive the app ID of the messenger app MA and the notification content information in which the notification content indicates the message information. Next, the server control unit 71 uses the function of the in-vehicle situation monitoring reception app KJA to refer to the specified notification information display table T1 and determines whether the app ID of the messenger app MA and the notification content are stored. In this case, the server control unit 71 determines that the app ID and the notification content are stored as shown in FIG. 6.

Returning to the description of FIG. 6, if the server control unit 71 determines that the information indicated by the application information and the notification content information is not stored (step SE2: NO), the server control unit 71 uses the function of the notification transmission app TSA to execute a process of step SE6. The process of step SE6 will be described later.

On the other hand, if the server control unit 71 determines that the information indicated by the application information and the notification content information are stored (step SE2: YES), the server control unit 71 uses the function of the notification transmission app TSA to specify the record based on the determination. When the messenger app MA receives the notification information in which the notification content is the message information from the messenger server, the server control unit 71 specifies a record R1.

Next, the server control unit 71 uses the function of the notification transmission app TSA to refer to the head-up display field F21 and the display panel field F22 associated with the specified record and determines whether to display the message on the head-up display 4 and/or the display panel 33a based on the stored information indicating whether to display the message (step SE3). In the case of the record R1, the server control unit 71 determines to display the message based on the message information on the head-up display 4 and not to display the message on the display panel 33a.

If the server control unit 71 determines to display the message on the head-up display 4 and/or the display panel 33a (step SE3: YES), the server control unit 71 uses the function of the notification transmission app TSA to refer to the reception notification field F31 and the text field F32 and determines whether to output the voice of the reception notification and the information based on the notification information, based on the stored information indicating whether to output the voice (step SE4). In the case of the record R1, the server control unit 71 determines not to output the voice of the message based on the reception notification and the message information.

Next, the server control unit 71 uses the function of the notification transmission app TSA to generate display location information indicating the display device that displays the information based on the notification information and voice determination information indicating the determination result of whether to output the voice, based on the determination results of step SE3 and step SE4. For example, in the case of the record R1, the server control unit 71 generates display location information indicating to display the message based on the message information on the head-up display 4 and not to display the message on the display panel 33a and generates voice determination information indicating not to output the voice of the reception notification and the message based on the message information.

On the other hand, if the server control unit 71 determines not to display the message on the head-up display 4 and/or the display panel 33a in step SE3 (step SE3: NO), the server control unit 71 does not generate display location information described later (step SE6). Since the server control unit 71 does not generate the display location information, the server control unit 71 does not transmit the display location information to the mobile terminal 5 in a process described later. Therefore, the information based on the notification information is not output and not displayed by the head-up display 4 and/or the display panel 33a.

<When Passenger Other than Driver Is Sleeping>

Next, the case in which the passenger other than the driver is sleeping will be described.

When the server control unit 71 detects that the situation of the passenger is the situation in which the passenger other than the driver is sleeping based on the passenger information received by the function of the in-vehicle situation monitoring reception app KJA, the server control unit 71 specifies the notification information display table T2 from the notification information display tables T stored in the server storage unit 72.

Next, the server control unit 71 uses the function of the notification transmission app TSA to refer to the notification information display table T2 and determines whether the information indicated by the notification related information received from the mobile terminal 5 is stored (step SE2).

Next, if the server control unit 71 determines that the application information and the notification content information are not stored (step SE2: NO), the server control unit 71 uses the function of the notification transmission app TSA to execute the process of step SE6.

On the other hand, if the server control unit 71 determines that the application information and the notification content information are stored (step SE2: YES), the server control unit 71 uses the function of the notification transmission app TSA to specify the record according to the application information and the notification content information. For example, when the news app NA receives the notification information indicating the news updating information from the news server, the server control unit 71 specifies a record R3.

Next, the server control unit 71 uses the function of the notification transmission app TSA to refer to the head-up display field F21 and the display panel field F22 associated with the specified record and determines whether to display the news on the head-up display 4 and/or the display panel 33a based on the stored information indicating whether to display the news (step SE3). In the case of the record R3, the server control unit 71 determines to display the news based on the news updating information on the display panel 33a and not to display the news on the head-up display 4.

If the server control unit 71 determines to display the news on the head-up display 4 and/or the display panel 33a (step SE3: YES), the server control unit 71 uses the function of the notification transmission app TSA to refer to the reception notification field F31 and the text field F32 and determines whether to output the voice of the reception information and the news based on the news updating information, based on the stored information indicating whether to output the voice (step SE4). In the case of the record R3, the server control unit 71 determines not to output the voice.

Next, the server control unit 71 uses the function of the notification transmission app TSA to generate display location information indicating the display device that displays the information based on the notification information and generate voice determination information indicating the determination result of whether to output the voice of the reception notification and the information based on the notification information, based on the determination results of step SE3 and step SE4. For example, in the case of the record R3, the server control unit 71 generates display location information indicating to display the news based on the news information on the display panel 33a and not to display the news on the head-up display 4 and generates voice determination information indicating not to output the voice of the reception notification and the news based on the news information.

On the other hand, if the server control unit 71 determines not to display the news on the head-up display 4 and/or the display panel 33a (step SE3: NO), the server control unit 71 does not generate the display location information (step SE6).

<When There Is No Passenger Other than Driver>

Next, the case in which there is no passenger other than the driver will be described.

When the server control unit 71 detects that the situation of the passenger is the situation in which there is no passenger other than the driver based on the passenger information received by the function of the in-vehicle situation monitoring reception app KJA, the server control unit 71 specifies the notification information display table T3 from the notification information display tables T stored in the server storage unit 72.

Next, the server control unit 71 uses the function of the notification transmission app TSA to refer to the notification information display table T3 and determines whether the information indicated by the notification related information received from the mobile terminal 5 is stored (step SE2).

Next, if the server control unit 71 determines that the application information and the notification content information are not stored (step SE2: NO), the server control unit 71 uses the function of the notification transmission app TSA to execute the process of step SE6.

On the other hand, if the server control unit 71 determines that the application information and the notification content information are stored (step SE2: YES), the server control unit 71 uses the function of the notification transmission app TSA to specify the record based on the application information and the notification content information. For example, when the messenger app MA receives the notification information of the message information from the messenger server, the server control unit 71 specifies a record R4.

Next, the server control unit 71 uses the function of the notification transmission app TSA to refer to the head-up display field F21 and the display panel field F22 associated with the specified record and determines whether to display the message on the head-up display 4 and/or the display panel 33a (step SE3). In the case of the record R3, the server control unit 71 determines to display the message based on the message information on the head-up display 4 and the display panel 33a.

If the server control unit 71 determines to display the message on the head-up display 4 and/or the display panel 33a (step SE3: YES), the server control unit 71 uses the function of the notification transmission app TSA to refer to the reception notification field F31 and the text field F32 and determines whether to output the voice of the reception notification and the information based on the notification information, based on the stored information indicating whether to output the voice (step SE4). In the case of the record R4, the server control unit 71 determines to output the voice of both.

Next, the server control unit 71 uses the function of the notification transmission app TSA to generate display location information indicating the display device that displays the information based on the notification information and generate voice determination information indicating the determination result of whether to output the voice, based on the determination results of step SE3 and step SE4. For example, in the case of the record R4, the server control unit 71 generates display location information indicating to display the message based on the message information on the head-up display 4 and the display panel 33a and generates voice determination information indicating to output the voice of the reception notification and the message based on the message information.

On the other hand, if the server control unit 71 determines not to display the message on the head-up display 4 and/or the display panel 33a (step SE3: NO), the server control unit 71 does not generate the display location information (step SE6).

Returning to the description of the flow charts of FIGS. 4A to 4D, after the execution of the output related process shown in step SD2 of FIG. 4D, the server control unit 71 uses the function of the notification transmission app TSA to transmit the display location information and the voice determination information generated in the output related process to the mobile terminal 5 (step SD3).

In FIG. 4B, the terminal control unit 51 of the mobile terminal 5 uses the function of the notification integration app TA to receive the display location information and the voice determination information (step SB3). Next, the terminal control unit 51 uses the function of the notification integration app TA to transmit the notification information, the display location information, and the voice determination information to the navigation device 3 (step SB4).

In FIG. 4C, the control unit 31 of the navigation device 3 uses the function of the notification reception app TJA to receive the notification information, the display location information, and the voice determination information (step SC1). Here, the notification reception app TJA is an application for communicating with the notification transmission app TSA to receive predetermined information from the notification transmission app TSA.

Next, the control unit 31 uses the functions of the notification display control app THA and the voice output control app OSA to execute an information output process that is a process of outputting information based on the notification information, based on the notification information, the display location information, and the voice determination information. Here, the notification display control app THA is an application for controlling the head-up display 4 that is a display device connected to the navigation device 3 and the display panel 33a included in the navigation device 3. The voice output control app OSA is an application for controlling the speaker.

FIG. 8 is a flow chart showing an action of the navigation device 3 in the information output process.

The control unit 31 uses the function of the notification display control app THA to determine whether to display the information based on the notification information on the head-up display 4 and the display panel 33a, based on the display location information (step SF1).

If the information based on the notification information is to be displayed on the head-up display 4 and the display panel 33a (step SF1: YES), the control unit 31 uses the functions of the notification display control app THA and the voice output control app OSA to output the voice based on the voice determination information and display the information based on the notification information on the head-up display 4 and the display panel 33a (step SF4). Note that in displaying the information based on the notification information, the control unit 31 uses the function of the display panel drawing app HBA to cause the display panel 33a to display the information in a predetermined format based on the notification information and uses a function of a head-up display drawing app HUA to cause the head-up display 4 to display the information in a predetermined format based on the notification information. The display panel drawing app HBA is an application for drawing predetermined information on the display panel 33a in a predetermined format. The head-up display drawing app HUA is an application for drawing predetermined information on the head-up display 4 in a predetermined format.

Figure 9A:
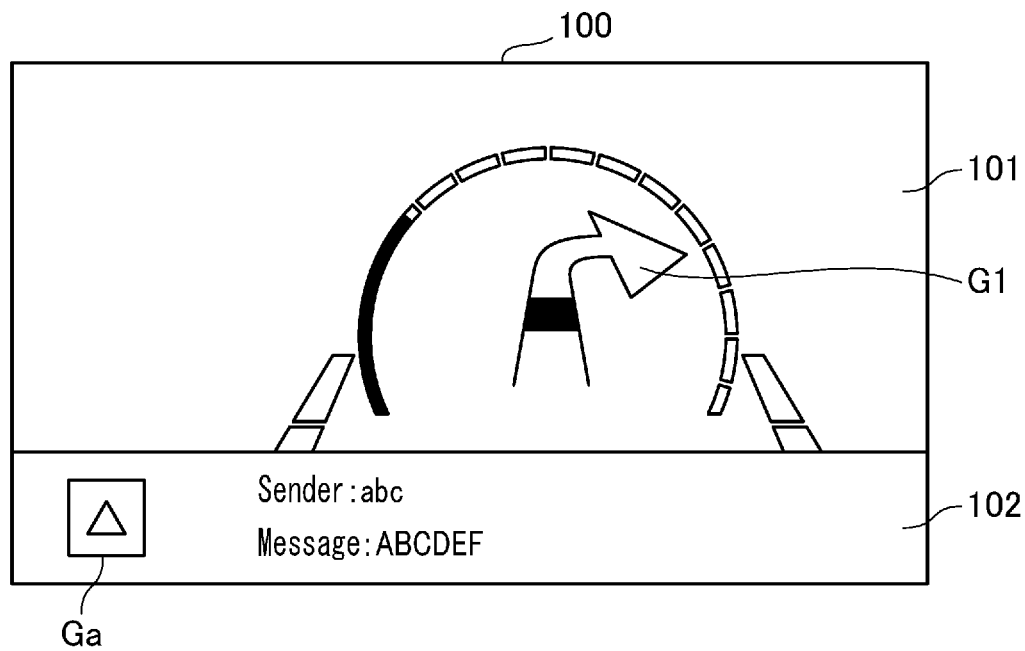
FIGS. 9A and 9B are diagrams showing examples of display screens of a head-up display and a display panel.
Figure 9B:
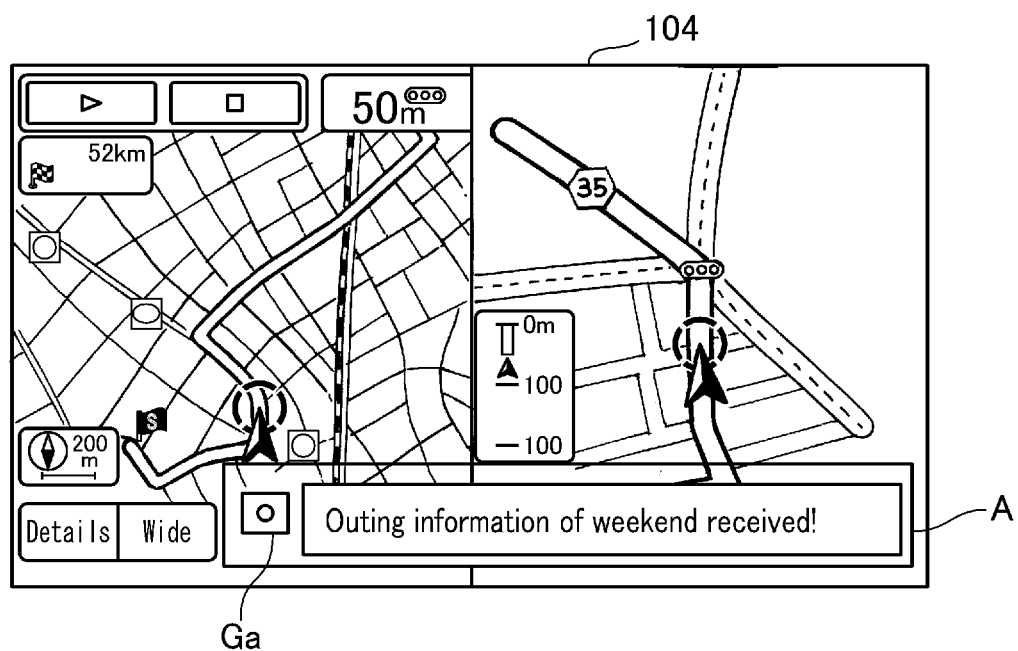

FIGS. 9A and 9B are diagrams showing examples of display screens. FIG. 9A shows a display screen 100 of the head-up display 4, and FIG. 9B shows a display screen 104 of the display panel 33a.

The display screen 100 of the head-up display 4 shown in the example of FIG. 9A includes: an information display screen 101 that displays information for supporting the drive of the driver based on the traveling road or traffic information; and a notification information display screen 102 that displays information based on the notification information. The information display screen 101 uses the function of the head-up display drawing app HUA to display information of guidance for the route searched by the navigation device 3, information indicating the speed of the vehicle 2, information indicating a warning to the user, and the like in a predetermined format. For example, the information of the guidance for the route is displayed by an arrow image G1 as shown in FIG. 9A. The notification information display screen 102 uses the function of the head-up display drawing app HUA to display a display image Ga indicating a logo of the notification app that has received the notification information and display a text indicating information based on the notification information. For example, when the messenger app MA receives the message information, the image of the logo of the messenger app MA, the name of the sender of the message, and the message based on the message information are displayed on the notification information display screen 102. The message is displayed only for a predetermined number of characters from the top.

The display screen 104 of the display panel 33a shown in the example of FIG. 9B uses the function of the display panel drawing app HBA to display a wide-range map based on map data on substantially the right half and display a narrow-range map on substantially the left half. The information based on the notification information is displayed by the function of the display panel drawing app HBA such that the display image Ga indicating the logo of the notification app and a text indicating the information based on the notification information are displayed over the map. The text is displayed in a text area A for displaying a text, along with the text area A. For example, when the news app NA receives news information, the display image Ga indicating the logo of the news app NA and a text indicating the reception of the news information are displayed. Note that the content of the news may be displayed by a text.

Returning to the description of the flow chart of FIG. 8, if the control unit 31 uses the function of the notification display control app THA and determines not to display the information based on the notification information on the head-up display 4 and the display panel 33a based on the display location information in step SF1 (step SF1: NO), the control unit 31 determines whether to display the information only on the head-up display 4 (step SF2).

If the control unit 31 determines to display the information based on the notification information only on the head-up display 4 (step SF2: YES), the control unit 31 uses the functions of the notification display control app THA and the voice output control app OSA to display the information based on the notification information on the head-up display 4 along with the output of the voice based on the voice determination information (step SF5).

On the other hand, if the control unit 31 determines not to display the information based on the notification information on the head-up display 4 (step SF2: NO), the control unit 31 uses the function of the notification display control app THA to determine whether to display the information only on the display panel 33a (step SF3).

If the control unit 31 determines to display the information based on the notification information on the display panel 33a (step SF3: YES), the control unit 31 uses the functions of the notification display control app THA and the voice output control app OSA to display the information based on the notification information on the display panel 33a along with the output of the voice based on the voice determination information (step SF6).

Here, the information output process of each case based on the display location information and the voice determination information generated based on the record R1, a record R2, the record R3, and the record R4 shown in FIG. 6 will be illustrated.

<Record R1>

The record R1 is a record specified at the reception of the notification information of the message information by the messenger app MA when there is a passenger other than the driver in the vehicle 2. When the display location information and the voice determination information are generated based on the record R1, the control unit 31 of the navigation device 3 displays the information based on the notification information on the head-up display 4 and does not display the information on the display panel 33a. The voice determination information in the record R1 is information indicating not to output the voice of the reception notification and the message based on the message information. Therefore, the control unit 31 displays the message based on the message information on the display device, but does not output the voice.

By the way, the message information is notification information with private notification content, and it is desirable that only the driver acquire the information as described above. In other words, the message information is information that cannot be shared with the passenger other than the driver. Therefore, the control unit 31 does not display the information that cannot be shared on the display panel 33a and does not output the voice as in the information output process based on the record R1, and the information is not acquired by the passenger other than the driver. Therefore, the control unit 31 can prevent the private information regarding the driver from being shared by the passenger other than the driver. Furthermore, the voice is not output, and the control unit 31 can prevent disturbing the conversation even when the driver is talking with the passenger other than the driver.

<Record R2>

The record R2 is a record specified at the reception of the notification information of the news updating information by the news app NA when there is a passenger other the driver in the vehicle 2. When the display location information and the voice determination information are generated based on the record R2, the control unit 31 of the navigation device 3 displays the information based on the notification information on the display panel 33a and does not display the information on the head-up display 4. The voice determination information in the record R2 indicates to output the voice of the reception notification and the news based on the news updating information. Therefore, the control unit 31 displays the news based on the news updating information on the display device and outputs the voice.

By the way, as described above, the news updating information is not information related to the travel of the vehicle 2 and is information less necessary for the driver. However, the news updating information includes beneficial information, such as latest events, and it is desirable that the passengers including the driver acquire the information. That is, unlike the message information, the news updating information is information that can be shared by the passengers including the driver. Therefore, the control unit 31 displays the information that can be shared on the display panel 33a and outputs the voice as in the information output process based on the record R2, and the information can be shared by the passengers including the driver. Information other than the information related to the travel of the vehicle 2 is not displayed on the head-up display 4, and this can prevent the driver from being distracted in driving the vehicle 2.

<Record R3>

The record R3 is a record specified at the reception of the notification information of the news updating information by the news app NA when the passenger other than the driver in the vehicle 2 is sleeping. When the display location information and the voice determination information are generated based on the record R3, the control unit 31 of the navigation device 3 displays the news based on the news updating information on the display panel 33a and does not display the news on the head-up display 4. Particularly, the voice determination information in the record R3 indicates not to output the voice of the reception notification and the news based on the news updating information. Therefore, the control unit 31 displays the news based on the news updating information on the display panel 33a, but does not output the voice.

As described, the news information is information that can be shared by the passengers including the driver, unlike the message information. However, while the control unit 31 displays the information that can be shared on the display panel 33a, the control unit 31 does not output the voice as in the information output process based on the record R3. Therefore, the control unit 31 can prevent disturbing the sleep of the passenger other than the driver.

<Record R4>

The record R4 is a record specified at the reception of the notification information of the message information by the messenger app MA when there is no passenger other than the driver in the vehicle 2. When the display location information and the voice determination information are generated based on the record R4, the control unit 31 of the navigation device 3 displays the message based on the message information on the head-up display 4 and the display panel 33a. The voice determination information in the record R4 is information indicating to output the voice of the reception notification and the message based on the message information. Therefore, the control unit 31 displays the message based on the message information on the head-up display 4 and the display panel 33a and outputs the voice.

By the way, like the record R1, the record R4 is a record specified when the messenger app MA receives the message information, but the record R4 is stored in a notification information display table T different from the record R1. That is, the record R4 is stored in the notification information display table T3 in which the situation of the passenger is the situation without a passenger other than the driver. When the display location information and the voice determination information are generated based on the record R4, the control unit 31 displays the message based on the message information on the head-up display 4 and the display panel 33a and outputs the voice. Therefore, even if the information includes private notification content as in the message information, the control unit 31 displays the information on the head-up display 4 and the display panel 33a and outputs the voice to surely notify the driver of the information. However, the information is not shared by other passengers in this case, because there is no passenger other than the driver in the vehicle 2. In this way, even when, for example, the messenger app MA receives the message information, the output of the information based on the notification information varies according to the situation of the passenger. This is because the notification information display table T stored in the server storage unit 72 varies according to the situation of the passenger. In this way, the notification information display table T varies according to the situation of the passenger, and the control unit 31 always uses the function of the in-vehicle situation monitoring app KA to transmit the passenger information to the control server 7. Therefore, even when, for example, the message information is received after a passenger other than the driver rides on the vehicle 2 in which only the driver is riding, special setting or the like is not necessary, and this can prevent the private information from being shared by the passenger other than the driver.

As described, the information processing system 1 of the present embodiment includes: the navigation device 3 (on-vehicle device) mounted on the vehicle 2; the mobile terminal 5 (terminal device) that can communicate with the navigation device 3; and the control server 7 (information processing device) that can communicate with the mobile terminal 5. The navigation device 3 is connected to the head-up display 4 as a display device that allows the driver to visually recognize the display of the displayed information and includes the display panel 33a as a display device that allows the driver and the passenger other than the driver to visually recognize the display of the displayed information. The mobile terminal 5 receives the notification information for notifying predetermined information, transmits the notification information to the navigation device 3, and transmits the notification related information regarding the notification information to the control server 7. The server control unit 71 determines the display device that displays the information based on the notification information in the navigation device 3 based on the notification related information received from the mobile terminal 5 and directly transmits the display location information indicating the determined display device to the navigation device 3 or transmits the display location information to the navigation device 3 through the mobile terminal 5. The navigation device 3 receives the notification information from the mobile terminal 5 and receives the display location information from the mobile terminal 5 or the control server 7 to display the information based on the notification information on the display device indicated by the received display location information.

In this way, the information processing system 1 can display the information on the display device according to the notification information.

Furthermore, the navigation device 3 in the information processing system 1 of the present embodiment directly transmits the passenger information indicating the situation of the passenger other than the driver in the vehicle 2 to the control server 7 or transmits the passenger information to the control server 7 through the mobile terminal 5. The control server 7 receives the passenger information from the navigation device 3 and determines the display device based on the received notification related information and passenger information.

Particularly, the control server 7 determines the display device based on the information indicating the presence/absence of the passenger other than the driver in the vehicle 2 and the notification related information.

As a result, the control server 7 of the information processing system 1 can take into account the situation of the passenger other than the driver in the vehicle 2 to determine the display device that displays the information based on the notification information. Particularly, the display device that displays the information based on the notification information is determined based on the information indicating whether the passenger other than the driver is riding. Therefore, the information can be displayed on the display device according to the ride of the passenger other than the driver, and the convenience of the user is improved.

Furthermore, in the present embodiment, the control server 7 determines whether to output the voice of the information based on the notification information, based on the notification related information and the passenger information received from the mobile terminal 5. The control server 7 directly transmits the voice determination information indicating the determination result to the navigation device 3 along with the display location information or transmits the voice determination information to the navigation device 3 through the mobile terminal 5. The navigation device 3 receives the notification information from the mobile terminal 5 and receives the display location information and the voice determination information from the mobile terminal 5 or the control server 7. The navigation device 3 displays the information based on the notification information on the display device indicated by the received display location information and outputs the voice when the voice determination information indicates to output the voice.

As a result, when the voice determination information indicates to output the voice, the navigation device 3 of the information processing system 1 can display the information indicated by the notification information on the display device and can output the voice.

Furthermore, in the present embodiment, the control server 7 determines the display device based on the information indicating whether the passenger other than the driver is sleeping.

As a result, the navigation device 3 of the information processing system 1 can output the information based on the notification information without disturbing the sleep of the passenger.

Furthermore, the mobile terminal 5 stores the notification app that processes the notification information in the present embodiment. When the mobile terminal 5 receives the notification information, the mobile terminal 5 transmits, to the information processing device, the notification related information including the application information indicating the notification app that processes the received notification information and the notification content information indicating the notification content of the notification information.

As a result, the information processing system 1 can output the information based on the notification information based on the notification content of the notification information processed by the notification app. As described, it is desirable that the driver and the passenger other than the driver acquire the notification information of the news information, for example. On the other hand, the notification information of the message information is private information, and it is desirable that only the driver acquire the information. Therefore, the information processing system 1 of the present embodiment can display the information that can be shared on the display device to allow the driver and the passenger other than the driver to acquire the information. On the other hand, the information processing system 1 can display the information that cannot be shared on the display device to allow only the driver to acquire the information. Therefore, the information processing system 1 prevents the passenger other than the driver from acquiring the private information.

<Second Embodiment>

Next, a second embodiment will be described.

Figure 10:
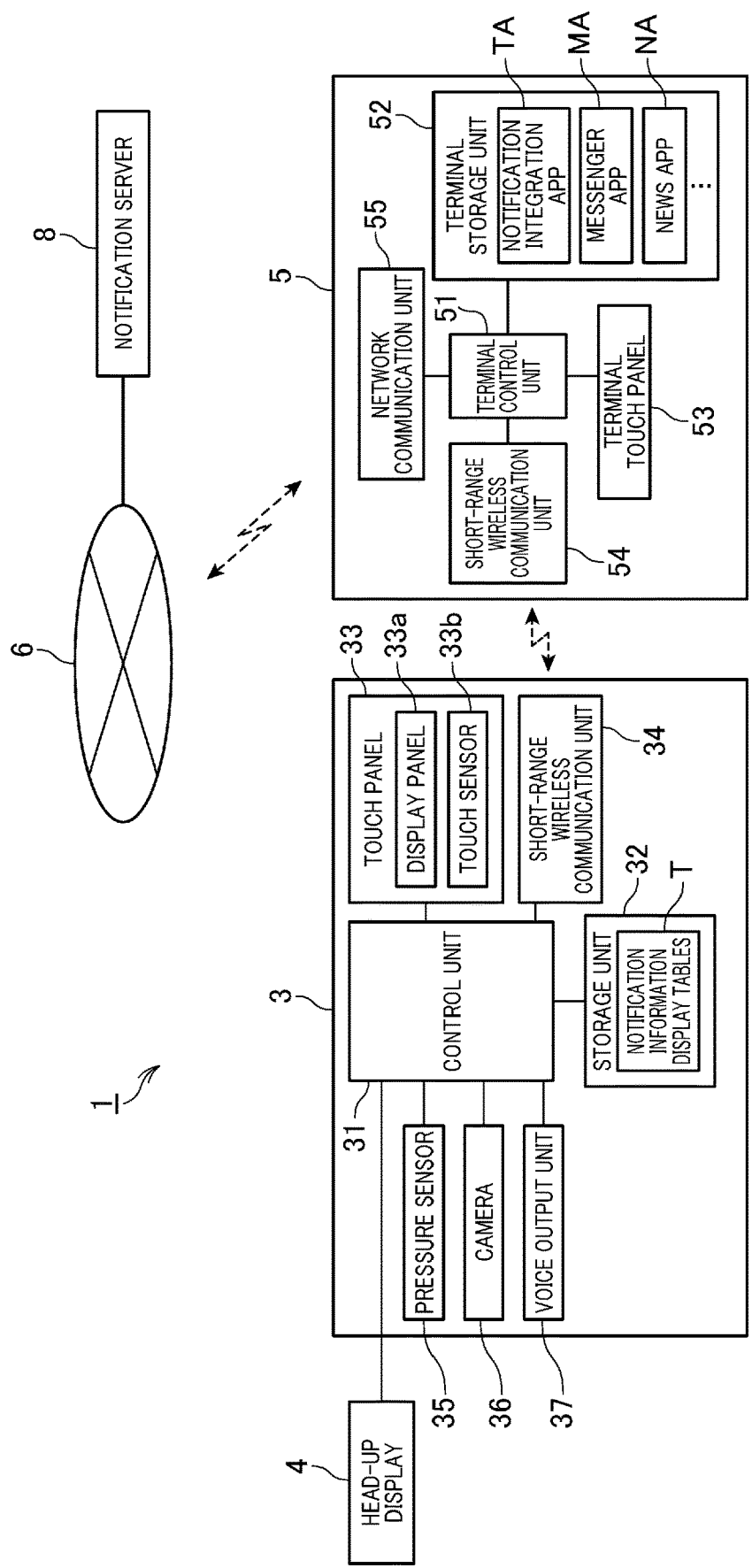
FIG. 10 is a diagram showing a configuration of an information processing system according to a second embodiment.

FIG. 10 is a diagram showing a configuration of the information processing system 1 according to the second embodiment. In the following description, the same reference signs are provided to the same constituent elements as the constituent elements of the information processing system 1 according to the first embodiment, and the detailed description will not be repeated.

As is evident from the comparison of FIGS. 2 and 10, the storage unit 32 of the navigation device 3 stores the notification information display tables T in the information processing system 1 according to the second embodiment. More specifically, the control unit 31 of the navigation device 3 executes the output related process in the information processing system 1 of the second embodiment. In this case, the control unit 31 uses the function of the notification reception app TJA to receive predetermined information from the notification integration app TA. Furthermore, the control unit 31 uses the function of the notification reception app TJA to generate the display location information and the voice determination information.

Here, an action of the information processing system 1 according to the second embodiment will be described.

The terminal control unit 51 of the mobile terminal 5 uses the function of the notification integration app TA to transmit the notification information and the notification related information received from the notification server 8 through the function of the notification app to the navigation device 3. The navigation device 3 uses the function of the notification reception app TJA to receive the notification information and the notification related information. Next, the control unit 31 of the navigation device 3 uses the function of the in-vehicle situation monitoring app KA to specify the notification information display table T stored in the storage unit 32 based on the acquired passenger information. Next, the control unit 31 uses the function of the notification reception app TJA to specify the record stored in the specified notification information display table T based on the notification related information and generates the display location information and the voice determination information based on the record. Next, the navigation device 3 uses the functions of the notification display control app THA and the voice output control app OSA to output the information based on the notification information, based on the notification information, the display location information, and the voice determination information.

As described, the navigation device 3 of the information processing system 1 according to the second embodiment is mounted on the vehicle 2 and can be connected to the mobile terminal 5 that receives the notification information for notifying the predetermined information. The navigation device 3 is connected to the head-up display 4 as a display device that allows the driver to visually recognize the display of the displayed information and includes the display panel 33a as a display device that allows the driver and the passenger other than the driver to visually recognize the display of the displayed information. The navigation device 3 receives the notification information from the mobile terminal 5 to determine the display device that displays the information based on the notification information and displays the information based on the notification information on the determined display device.

As a result, the information processing system 1 according to the present embodiment configured in this way can also attain the same advantageous effects as in the information processing system 1 according to the first embodiment. Furthermore, compared to the information processing system 1 according to the first embodiment, the control server 7 is not involved in the information processing system 1 according to the second embodiment, and the action of the system can be simplified.

<Third Embodiment>

Next, a third embodiment will be described.

FIG. 11 is a diagram showing a configuration of the information processing system 1 according to the third embodiment. In the following description, the same reference signs are provided to the same constituent elements as the constituent elements of the information processing system 1 according to the first and second embodiments, and the detailed description will not be repeated.

As is evident from the comparison of FIGS. 2, 10, and 11, the terminal storage unit 52 of the mobile terminal 5 stores the notification information display tables T in the information processing system 1 according to the third embodiment. More specifically, the terminal control unit 51 of the mobile terminal 5 executes the output related process in the information processing system 1 of the third embodiment. In this case, the terminal control unit 51 uses the function of the notification integration app TA to receive the passenger information from the navigation device 3 and generates the display location information and the voice determination information.

Here, an action of the information processing system 1 according to the third embodiment will be described.

The terminal control unit 51 of the mobile terminal 5 uses the function of the notification app to receive the notification information from the notification server 8. The terminal control unit 51 uses the function of the notification integration app TA to receive the passenger information from the navigation device 3. Next, the terminal control unit 51 uses the function of the notification integration app TA to specify the notification information display table T corresponding to the situation of the passenger based on the passenger information. Next, the terminal control unit 51 uses the function of the notification integration app TA to specify the record stored in the specified notification information display table T based on the notification related information and generates the display location information and the voice determination information based on the record. Next, the terminal control unit 51 uses the function of the notification integration app TA to transmit the notification information, the display location information, and the voice determination information to the navigation device 3. The navigation device 3 uses the function of the notification reception app TJA to receive the notification information, the display location information, and the voice determination information and uses the functions of the notification display control app THA and the voice output control app OSA to output the information based on the notification information, based on the notification information, the display location information, and the voice determination information.

As described, the mobile terminal 5 of the information processing system 1 according to the second embodiment is connected to the head-up display 4 as a display device that allows the driver to visually recognize the display of the displayed information and can be connected to an on-vehicle device including the display panel 33a as a display device that allows the driver and the passenger other than the driver to visually recognize the display of the displayed information. The mobile terminal 5 receives the notification information for notifying the predetermined information and determines the display device that displays the information based on the notification information in the navigation device 3. The mobile terminal 5 transmits the display location information indicating the determined display device and the notification information to the navigation device 3.

As a result, the information processing system 1 according to the present embodiment configured in this way can also attain the same advantageous effects as in the information processing system 1 according to the first and second embodiments.

The embodiments described above just illustrate examples of the present invention, and modifications and applications can be arbitrarily made without departing from the scope of the present invention.

For example, although the head-up display 4 illustrated above is a combiner type head-up display 4, the head-up display 4 is not limited to this. For example, the head-up display 4 may be a windshield type head-up display 4 that projects an image on the windshield of the vehicle 2.

Furthermore, for example, although the passenger information is the detection signal of the pressure sensor 35 and the photographed image data of the camera 36, the passenger information is not limited to this, and voice collected by a microphone or the like may also be the passenger information. In this case, a device, such as a microphone, that collects the voice is connected to the navigation device 3.

Furthermore, for example, although the notification integration app TA uses the API to receive the notification information from the notification apps in the case illustrated above, the configuration is not limited to this. The notification integration app TA may acquire the notification information from an operating system (hereinafter, expressed as OS). The OS plays a role of an interface between the hardware and the applications and between the applications. Therefore, the OS intermediates the transfer of the notification information from the notification apps to the notification integration app TA in this case.

Furthermore, for example, FIG. 5 is a schematic view classifying the functional components of the information processing system 1 by application according to main processing content in order to facilitate the understanding of the present invention, and the components of the information processing system 1 can also be classified into more constituent elements according to the processing content. Furthermore, the components can also be classified such that one constituent element executes many processes.

Furthermore, for example, the processing units of the flow charts of FIGS. 4A to 4D, 6, and 8 are mainly divided according to the processing content to facilitate the understanding of the processes by the information processing system 1, the control server 7, and the navigation device 3. The present invention is not limited by the method of dividing the processing units or the names of the processing units. The processes by the information processing system 1, the control server 7, and the navigation device 3 can also be divided into more processing units according to the processing content. Furthermore, the processes can also be divided such that one processing unit includes more processes.

REFERENCE SIGNS LIST 1 information processing system
2 vehicle
3 navigation device (on-vehicle device)
4 head-up display
5 mobile terminal (terminal device)
7 control server (information processing device)
33a display panel

The invention claimed is:

1. An information processing system for privacy management comprising: an on-vehicle device having a first CPU and mounted on a vehicle; a terminal device that has a second CPU and configured to communicate with the on-vehicle device; and an information processing device that has a third CPU and configured to communicate with the terminal device, wherein
the on-vehicle device
is connected to a head-up display as a display device that allows a driver to visually recognize display of displayed information, connected to at least one pressure sensor and to a camera, comprises a display panel as a display device that allows the driver and a passenger other than the driver to visually recognize display of displayed information, and comprises a speaker that outputs voice,
the first CPU of the on-vehicle device
is configured to determine whether a passenger other than the driver is present based on a signal from the pressure sensor,
is configured to determine whether the passenger is sleeping based on an image from the camera,
is configured to generate passenger information indicating results of the presence and the sleeping of the passenger, and
is configured to transmit the passenger information to the information processing device directly or via the terminal device,
the second CPU of the terminal device
is configured to receive notification information for notifying predetermined information, is configured to transmit the notification information to the on-vehicle device, and is configured to transmit notification related information regarding the notification information to the information processing device,
the information processing device comprises a memory that stores a notification information display table which associates the passenger information with the notification information, display location of the notification information, and whether to output voice of the notification information,
the third CPU of the information processing device
is configured to generate
display location information that determines the display device that displays information based on the notification information in the on-vehicle device and
voice determination information that indicates result that determines whether to output voice of the information based on the notification information in the on-vehicle device
based on the notification related information received from the terminal device and the passenger information received from the on-vehicle device in reference to the notification information display table, and
the first CPU of the on-vehicle device
is configured to receive the notification information from the terminal device, to receive the display location information and the voice determination information from the terminal device or the information processing device, and
is configured to display the information based on the notification information
on the head-up display in the state where a passenger other than the driver is present in the vehicle and the passenger is not sleeping, and
on the display panel in the state where no passenger other than the driver exists in the vehicle or in the state where a passenger other than the driver is sleeping in the vehicle
based on the display location information and
is configured to output the information based on the notification information with voice by the speaker in the state where no passenger other than the driver exists in the vehicle
based on the voice determination information.

2. The information processing system for privacy management according to claim 1, wherein
the terminal device has a memory that
stores applications that process the notification information and
the second CPU of the terminal device is configured to transmit, to the information processing device, the notification related information including application information indicating the application that processes the received notification information and notification content information indicating notification content of the notification information when the terminal device receives the notification information.

3. An on-vehicle device for privacy management that is mounted on a vehicle comprising: a CPU, wherein
the CPU is configured to perform communication with an information processing device directly or via a terminal device, wherein
the on-vehicle device is connected to a head-up display as a display device that allows a driver to visually recognize display of displayed information, is connected to at least one pressure sensor and to a camera, comprises a display panel as a display device that allows the driver and a passenger other than the driver to visually recognize display of displayed information, and comprises a speaker that outputs voice,
the information processing device comprises a memory that stores a notification information display table which associates the passenger information with the notification information, display location of the notification information, and whether to output voice of the notification information,
the CPU is configured to determine whether a passenger other than the driver is present based on a signal from the pressure sensor, is configured to determine whether the passenger is sleeping based on an image from the camera, is configured to generate passenger information indicating results of the presence and the sleeping of the passenger is configured to transmit the passenger information to the information processing device directly or via the terminal device, is configured to receive notification information for notifying predetermined information from the terminal device, is configured to receive
- display location information that determines the display device that displays information based on the notification information and
- voice determination information that indicates result that determines whether to output voice of the information based on the notification information
- directly from the information processing device or via the terminal device in reference to the notification information display table, wherein
- the display location information and the voice determination information are determined based on the passenger information and notification related information indicating a type of the notification information by the information processing device,
- the notification related information is generated based on the notification information by the terminal device, and is configured to display the information based on the notification information
- on the head-up display in the state where a passenger other than the driver is present in the vehicle and the passenger is not sleeping, and
- on the display panel in the state where no passenger other than the driver exists in the vehicle or in the state where a passenger other than the driver is sleeping in the vehicle
- based on the display location information and is configured to output the information based on the notification information with voice by the speaker in the state where no passenger other than the driver exists in the vehicle
- based on the voice determination information.

4. The information processing system according to claim 1, wherein
the terminal device is configured to receive the notification information for notifying predetermined information, is configured to determine the display device that displays information based on the notification information in the on-vehicle device, and is configured to transmit display location information indicating the determined display device and the notification information to the on-vehicle device.

\* \* \* \* \*